(12) United States Patent
Chan et al.

(10) Patent No.: US 12,380,432 B1
(45) Date of Patent: Aug. 5, 2025

(54) PHYSICAL DEVICE FOR REAL-TIME MINTING OF NON-FUNGIBLE TOKENS

(71) Applicant: SPLUNK INC., San Francisco, CA (US)

(72) Inventors: Christopher Yan-Loon Chan, Santa Clara, CA (US); Matthew Buckle, Cupertino, CA (US); Casing Chu, San Mateo, CA (US); Benjamin D. Dearinger, Bixby, OK (US); Himanshu Goyal, Vancouver (CA); Kelly Kong, Brooklyn, NY (US); Ryan Moore, St. Augustine, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/972,303

(22) Filed: Oct. 24, 2022

Related U.S. Application Data

(60) Provisional application No. 63/350,348, filed on Jun. 8, 2022.

(51) Int. Cl.
*G06Q 20/36* (2012.01)
*G06Q 20/38* (2012.01)

(52) U.S. Cl.
CPC ....... *G06Q 20/3678* (2013.01); *G06Q 20/389* (2013.01)

(58) Field of Classification Search
CPC .......................... G06Q 20/3678; G06Q 20/389
See application file for complete search history.

(56) References Cited

U.S. PATENT DOCUMENTS

| | | | | |
|---|---|---|---|---|
| 2021/0326862 A1* | 10/2021 | Yantis | ....................... | H04L 9/50 |
| 2022/0366762 A1* | 11/2022 | Nelson | ................ | G07F 17/3244 |
| 2022/0383306 A1* | 12/2022 | Smith | .................... | H04L 9/3239 |
| 2023/0038226 A1* | 2/2023 | Wilson | .................. | G06F 11/302 |
| 2023/0079195 A1* | 3/2023 | Matheson | .......... | G06Q 20/0655 705/44 |
| 2023/0188349 A1* | 6/2023 | Moy | ....................... | H04L 67/10 726/9 |
| 2023/0231713 A1* | 7/2023 | Seo | ....................... | H04L 9/3247 713/155 |

* cited by examiner

*Primary Examiner* — Patrick McAtee
*Assistant Examiner* — Karlyannie M. Garcia
(74) *Attorney, Agent, or Firm* — Polsinelli P.C.

(57) ABSTRACT

Token minting environment includes a physical token minter that is accessible to a group of users. A user initiates a session to mint a non-fungible token associated with an image that the physical token minter generates. When the session is established, the physical token minter connects with a digital wallet associated with the user. The physical token minter identifies a physical interaction provided by the user, such as the user pulling a lever or pressing an input button that is proximate to the physical token minter. Upon identifying the user interaction, the physical token minter responds by triggering the creation of an image and the minting of a non-fungible token that links the image to the wallet of the user. The physical token minter then provides a digital representation of the image and an indication that a token for the image has been added to the digital wallet.

20 Claims, 18 Drawing Sheets

PHYSICAL DEVICE FOR REAL-TIME MINTING OF NON-FUNGIBLE TOKENS

RELATED APPLICATIONS

This application claims priority benefit of the United States Provisional Patent Application titled, "PHYSICAL DEVICE FOR REAL-TIME MINTING OF NON-FUNGIBLE TOKENS," filed on Jun. 8, 2022 and having Ser. No. 63/350,348. Further, any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

Various systems have been created to generate virtual goods that are sold or otherwise distributed. Some of these systems generate tokens that have various properties and include portions of actively generated data. For example, a non-fungible token (NFT) can be a unique data item that can be transferred between devices. The NFT is linked with other information, including unique identifiers that link the NFT to a specific digital holder, such as a digital wallet. A contributor initially generates an NFT and engages in a transaction to transfer the NFT to a consumer. The transaction is published to a public distributed ledger such that members of the public can determine attributes of the NFT and determine ownership of the NFT.

BRIEF DESCRIPTION OF THE DRAWINGS

Illustrative examples are described in detail below with reference to the following figures.

DETAILED DESCRIPTION

Figure 1:
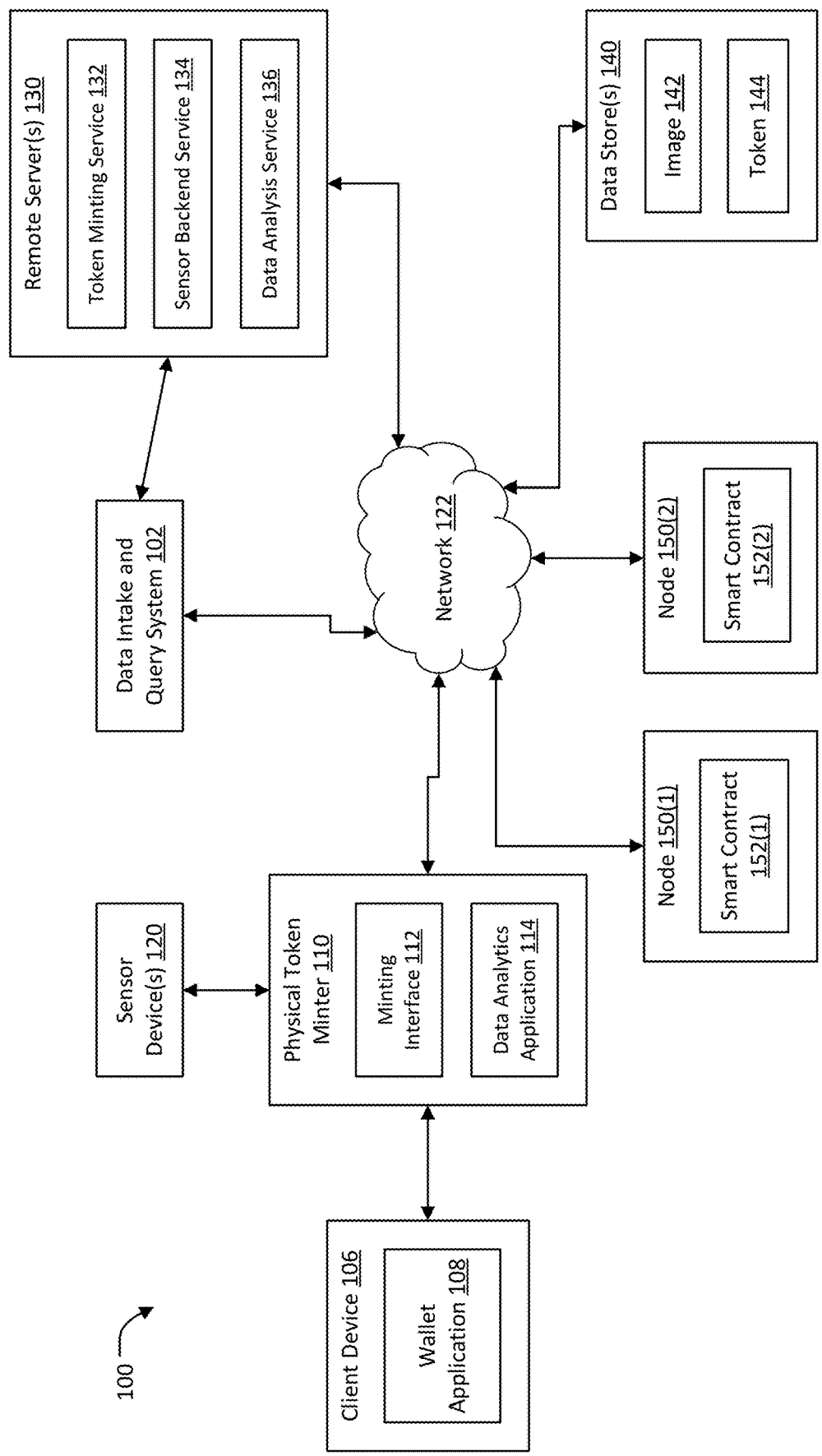
FIG. 1 is a block diagram of a token minting environment, in accordance with example implementations.

The decentralized nature of the computing systems that create and transfer NFTs gives rise to technical challenges associated with the creation of a given NFT. Such computing systems typically require large time and resource investments to generate an NFT, record the NFT to the ledger, and verify the record that has been added to the ledger. For example, a contributor will expend significant amounts of time, processing resources, and digital currency to generate a group of NFTs that are written to the distributed ledger and verified by other devices in the decentralized computer system. Further, once the NFTs are created, subsequent transactions between users can be distributed and can lack the levels of engagement associated with transactions that occur when participants are in close proximity. As a result, some participants have difficulties finding interested consumers and transferring the NFTs to consumers in an efficient manner to compensate for the initial investment.

In view of the foregoing, in various implementations, a token minting environment includes a physical token minter that is accessible to a group of users. A given user included in the group can initiate a session with the physical token minter to mint a non-fungible token associated with an image that the physical token minter generates. When the user establishes a session with the physical token minter, the physical token minter connects with a digital wallet associated with the user. The physical token minter then identifies a physical interaction provided by the user, such as the user pulling a lever or pressing an input button that is proximate to the physical token minter. Upon identifying the user interaction, the physical token minter responds by triggering the creation of an image and the minting of a non-fungible token that links the image to the wallet of the user. The physical token minter then provides a digital representation of the image and an indication that a token for the image has been added to the digital wallet.

In various implementations, upon detecting the user interaction, a token minter application in the physical token minter can initiate the minting of the non-fungible token by checking the digital wallet to determine whether the digital wallet contains sufficient funds to complete the minting process. The funds can be specific (e.g., a specific type of digital currency). The token minter application exhausts the digital wallet of the requisite funds and transmits a message to a first smart contract published on a distributed ledger. The message triggers the first smart contract by acquiring a randomly-generated artifact (e.g., an identifier number) and associating the artifact with the digital wallet. The token minter application generates a set of metadata based on the generated artifact. For example, the token minter application can use the artifact to determine a set of attribute values (e.g., background color, accessories, foreground colors, etc.) that are to be included in the image. The token minter application transmits the set of metadata to a second smart contract published on the distributed ledger, where the second smart contract mints a non-fungible token. The token minter application causes an image based on the attribute values to be produced and published. The non-fungible token lists the attributes included in the image and identifies the address of the published image.

In various implementations, the physical token minter also includes a data analytics application that acquires telemetry data and receives sensor data. The data analytics application acquires telemetry data that is associated with the physical token minter managing the generation of the non-fungible tokens via the user interactions. The data analytics receives sensor data that is acquired by a group of one or more sensor devices that are located within the token minter environment. The data analytics application transmits the telemetry data and the sensor data to a set of remote servers. The set of remote servers includes a data analysis server that processes and stores the telemetry data. The set of remote servers also includes a sensor backend service that aggregates and stores the sensor data. One or more data analytics applications operating on other devices in the token minting environment can acquire the telemetry data and the sensor data via a data intake and query system and display the acquired datasets in one or more dashboards.

At least one technological advantage of the disclosed techniques relative to prior techniques is that the physical token minter that is accessible to a group of users can respond in real time to a physical user interaction by causing the generation of an image and minting of a token linking the image to the user. Such techniques enable users to acquire non-fungible tokens that are added to a collection of tokens on-demand, reducing the processing and storage space needed to initially generate a collection. Further, by linking the minting of a non-fungible token to a physical interaction proximate to the physical token minter, the physical token minter can generate non-fungible tokens that are linked to specific locations and actions associated with the physical user interaction, thereby providing unique tokens that signify the actions of the user that initiated the minting of the non-fungible token.

FIG. 1 is a block diagram of a token minting environment 100, in accordance with example implementations. As shown, the token minting environment 100 includes, without limitation, a data intake and query system 102, a client device 106, a physical token minter 110, sensor device(s) 120, remote server(s) 130, data store(s) 140, and node(s) 150. The client device 106 includes, without limitation, a wallet application 108. The physical token minter 110 includes, without limitation, a minting interface 112 and a data analytics application 114. The remote servers 130 include, without limitation, a token minting service 132, a sensor backend service 134, and a data analysis service 136. The data stores 140 include, without limitation, one or more images 142 and one or more tokens 144. The nodes 150 include, without limitation, one or more smart contracts 152 (e.g., 152(1), 152(2)).

For explanatory purposes, multiple instances of like objects are denoted with reference numbers identifying the object and an additional number in parentheses identifying the instance where needed. Further, the token minting environment 100 includes multiple instances of elements, even when not shown. For example, the token minting environment 100 can include multiple images 142 (e.g., 142(1), 142(2), 142(3), etc.), tokens 144 (e.g., 144(1), 144(2), 144(3), etc.), sensors 120 (e.g., 120(1), 120(2), 120(3), etc.), and so forth, and still be within the scope of the disclosed implementations.

As will be discussed in further detail below in relation to FIGS. 14-17, in various implementations, the client device 106 functions substantially the same as the computing device 1404, 1504, 1604, 1704, except as further described herein. Examples of the client device 106 may include, without limitation, a laptop computer, a tablet computer, a handheld computer, a smartphone, a wearable device, an extended reality (XR) console, a portable media player, a gaming device, a streaming video device, and so forth. In some implementations, the client device 106 executes one or more applications that present, compute, or generate data based on data received from a data analysis service 136 and/or the data intake and query system 102.

The wallet application 108, executed by the client computing device 106, manages a digital wallet stored in a distributed computing environment. In various implementations, the wallet application is software stored on one or more non-transitory computer-readable media as a set of program instructions that the client computing device 106 executes to communicate with a digital wallet and execute transactions using funds from the digital wallet. The digital wallet is a software program and/or data structure that enables the user to make electronic transactions with others using digital currencies stored in the digital wallet or digital representations of physical currencies stored in the digital wallet. In various implementations, the wallet application 108 connects to a specific digital wallet and provides information about the digital wallet to the user and/or other devices and applications. For example, in various implementations, the wallet application 108 can provide a wallet identifier and a wallet balance to the physical token minter 110, as discussed in more detail below.

The physical token minter 110 is a physical device, such as a computing device configured to operate as an electronic slot machine, that is located in an area accessible to a group of users. In various implementations, the physical token minter 110 includes one or more computing devices that execute the minting interface 112 and/or the data analytics application 114. Examples of the computing device included in the physical token minter 110 may include, without limitation, a laptop computer, a desktop computer, a server, a tablet computer, a handheld computer, a smartphone, a wearable device, an extended reality (XR) console, a portable media player, a gaming device, a streaming video device, an Apple TV® device, and so forth.

In various implementations, the physical token minter 110 responds to a physical user interaction by communicating with a token minting service 132 operating in a backend remote server 130. The token minting service 132, upon determining that a digital wallet associated with the user includes a threshold amount of digital currency, manages communications with various devices to generate a non-fungible token (NFT) (e.g., the token 144) and a representative image (e.g., the image 142). In various implementations, the token minting service 132 responds in real-time by extracting funds from the digital wallet and initiating the minting of the NFT and the representative image. In such instances, the token minting service 132 uses the information provided by the wallet application 108 to determine whether the digital wallet includes sufficient funds to mint the token 144. In various implementations, the wallet application 108 establishes a session with the token minting service 132 as part of a minting process. In such instances, when the token minter application 132 receives an indication of the physical user interaction, the token minter application 132 extracts, based on wallet information provided by the wallet application 108, a requisite amount of funds from a digital wallet coupled to the wallet application 108.

When generating the token 144, the token minting service 132 executes a first smart contract 152(1) to randomly-generate an artifact (L, a randomly-generated number) and link the artifact with an identifier for the digital wallet. The token minting service 132 also generates a set of metadata associated with the artifact and/or associated with the physical user interaction. The token minting service 132 executes a second smart contract 152(2) to mint a token 144 that includes the generated set of metadata. The token minting service 132 also causes a representative image to be created based on the metadata. For example, the token minting service 132 can use the artifact as a key, index, seed, and/or variable to select a set of attribute values corresponding to a set of attribute fields associated with characteristics of an image. The token minting service 132 can then cause an image 142 to be generated that includes the characteristics corresponding to the set of attribute values. The second smart contract 152(2) publishes the token 144 to a distributed ledger, where the token 144 is stored in a distributed data store 140. The token minting service 132 also causes the image 142 to be published to the distributed data store 140, where various users can view the image 142 by accessing the image via a public digital address.

In various implementations, the physical token minter 110 is coupled to a set of sensor devices 120 that acquire various sensor data about a physical environment in which the physical token minter 110 is located. The sensor devices 120 and/or the physical token minter 110 transmit the acquired sensor data to a sensor backend service 134. The sensor backend service 134 ingests sensor data and stores the sensor data via the data intake and query system 102 and/or publishes the sensor data to one or more subscribers. In some implementations, the sensor backend service 134 generates a set of telemetry data associated with the physical token minter 110 and/or the one or more tokens 144 that were minted via the physical token minter 110. In such instances, the token minting service 132 transmits the telemetry data to the data analysis service 136 to store the telemetry data in the data intake and query system 102 and/or publish the telemetry data to one or more subscribers.

In various implementations, the physical token minter 110 includes or is coupled to one or more input devices with which a given user can physically interact to provide an input. In such instances, the physical token minter 110 can detect a physical interaction, such as the user pulling a slot lever, and can respond by providing an indication to the token minting service 132. In various implementations, the physical token minter 110 executes various applications, such as minting interface 112 and/or data analytics application 114 associated with the token minting process. For example, the physical token minter 110 can execute the minting interface 112 to communicate with a user and/or detect the physical user interaction. Additionally or alternatively, the physical token minter 110 can execute the data analytics application 114 in order to process sensor data and/or telemetry data associated with the token minting process and/or display various dashboards associated with datasets retrieved from the data intake and query system 102.

The minting interface 112 provides information to the user related to establishing a session with the token minting service 132 and/or information about various stages of the minting process. As will be discussed in further detail below, the token minting service 132 can update the minting interface 112 with information related to the generation of the image 142 and/or the token 144. In various implementations, the minting interface 112 is a graphical user interface (GUI) that the token minting service 132 updates with information related to the minting process. In some implementations, the token minting service 132 transmits a series of push notifications that cause the minting interface 112 to display the image 142, information included in the token 144, and/or information associated with the digital wallet.

In some implementations, the minting interface 112 presents information to the user for establishing a session with the token minting service 132. For example, the minting interface 112 can display a set of links, textual information, codes, and/or other information to enable the client device 106 to download the wallet application 108, generate a digital wallet, and/or establish a session with the minting interface 112. In some implementations, the token minting service 132 may establish a session with a single wallet application 108 at a given time. In such instances, the minting interface 112 can display information about the digital wallet and/or the wallet application 108 to which the current session is established.

The data analytics application 114 displays, computes, and/or generates data based on data received from the data intake and query system 102. In some implementations, the data analytics application 114 may use one or more identifiers (e.g., the wallet ID, an identifier for the physical token minter 110, a user identifier, etc.) and/or a dashboard (dashboard ID) to retrieve field values, extracted from events, which are associated with a specific subject or environment. In various implementations, the client device 106 and/or the data intake and query system 102 generates content (e.g., schemas, dashboards, cards, and/or visualizations) based on the extracted field values.

In various implementations, the data analytics application 114 retrieves data by querying a field-searchable data store included in the network. For example, the data analytics application 114 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data analytics application 114 could implement the data intake and query system 102 in order to extract one or more fields of data from a field-searchable data store. In such instances, the data analytics application 114 could retrieve the extracted fields as portions of a text string, such as: 2018-07-28 00:07:01,741 INFO [async_client][async_client][async_post_request][16574]POST headers={'Authorization': u'SplunkM4q2ROpGJC png41 W i8JJsyV1yGIxrIhI__1UsIUxvVk3m_I12q6Q43Dr f7P68v8H68kvQ7RHgA2eJz5o-LSnw4dOOyw EsTodOD0jdWDNGhj9zFGN-RuCiBWovEyXnO25X3_ aNjSwyO_rE_ik7', Content-Type: app lication/json'}, uri=https://127.0.0.1:4089/servicesNS/nobody/spacebridge-app/storage/collections/data/alert_recipient devices, params=None, data={"py/object": "spacebridge app.data.alert_data. RecipientDevice", "timestamp": "1132736421.201776", "alert_id": "5b5bb3 a540db2133e603d33f", "device_id": "y+DJALQwOXERwVDBzUe340ya1MINAId0IPzRB dtt51U="}host=ip-10-0-240-141 source=/opt/splunk/var/log/splunk/spacebridge-app.log sourcetype=spacebridge-app-too_small.

In some implementations, the data intake and query system 102 sends messages to the data analytics application 114 in accordance with a push notification service (not shown), such as the APPLE® Push Notification service (APN), or GOOGLE® Cloud Messaging (GCM). For example, the data analytics application 114 could receive various schemas, dashboards, playbooks, runbooks, cards, and/or visualizations that include real-time data associated with a particular machine and/or set of field-searchable events.

The nodes 150 are parts of a distributed operating system and/or a distributed storage system that store portions of a distributed ledger. For example, the nodes 150(1)-150(2) can store one or more copies of a distributed ledger that is stored as a blockchain. In such instances, each node 150 can store at least a portion of the distributed ledger and can verify new records that are to be added to the distributed ledger. In various implementations, a single node (e.g., the node 150(1)) includes multiple smart contracts 152 and one or more devices invoke the smart contracts 152 that are stored in the node 150.

The smart contracts 152 are types of records that are published to the distributed ledger. In some implementations, the smart contracts 152 can includes executable code, such as a scripting language, which can be executed in order to perform a function. In some implementations, the smart contract 152 can enable one or more applications to operate and perform functions associated with data included in the smart contract 152. In some implementations, the smart contracts 152 are published to a public distributed ledger. In such instances, the smart contract 152 can be executed by various devices that connect to the smart contract 152 and provide the applicable inputs. In some implementations, the smart contracts 152 respond to a new transaction that is added to the distributed ledger. In such instances, the device or application, such as the token minting service 132, can expend an amount of digital currency to add the transaction and invoke the smart contract 152.

The first smart contract 152(1) is a specific type of smart contract that token minting service 132 invokes to manage a collection of NFTs. In various implementations, the first smart contract 152(1) is compliant with the Ethereum 1155 standard ("ERC-1155: Multi-Token Standard") for managing multiple types of tokens. In various implementations, the first smart contract 152(1) includes executable code that creates one or more artifacts that are used to mint non-fungible tokens that include metadata. For example, the minting interface 112 can execute the first smart contract 152(1) to randomly-generate an artifact that includes a randomly-generated number. In such instances, the smart contract can generate a randomly-generated number and/or retrieve the randomly-generated number from a separate service (e.g., the Chainlink verifiable random function (VRF) service. In some implementations, the first smart contract 152(1) can generate a token that includes the artifact. In such instances, one or more devices can refer to the generated token in order to retrieve the artifact.

The second smart contract 152(2) is a type of smart contract that the token minting service 132 executes to mint a new token 144. In various implementations, the token minting service 132 invokes the second smart contract 152(2) in a real-time response to a physical user interaction. In some implementations, the second smart contract 152(2) can generate a token 144 that contains metadata and an identifier for the digital wallet of the user. In some implementations, the second smart contract 152(2) can respond to receiving a message from the token minting service 132 by retrieving a set of metadata from the token minting service 132 and adding the metadata to the contents of the token 144.

In some implementations, the second smart contract 152(2) can notify the token minting service 132 that the token 144 has been created before publishing the token 144 onto the distributed ledger. In such instances, the second smart contract 152(2) can publish a set of generated tokens 144 in a batch in lieu of publishing each token 144 as each token 144 is created. Further, the second smart contract 152(2) can, upon publishing the tokens onto the distributed ledger, provide a notification that the token 144 has been recorded.

The data store 140 includes one or more distributed data storage devices that store files or objects. In some implementations, the data store can be a public storage system that has data items publicly accessible via one or more digital addresses. For example, a token exchange or gallery can display an image 142 that is associated with a given token 144 by accessing a copy of the image 142 stored on the data store 140 via the digital address and providing a copy of the image 142 for viewing. In some implementations, the data store 140 can store a copy of the metadata included in the token in lieu of the token 144. In such instances, one or more devices (e.g., the token minting service 132) can acquire the metadata from the data store 140 in lieu of the token 144.

The image 142 is an image that is associated with the metadata generated by the token minting service 132. As will be discussed in further detail below, in various implementations, the token minting service 132 and/or another application can generate an image 142 that includes a set of attribute values associated with a set of attribute fields. For example, the image 142 can be in a collection of generative images that are formed by combining one or more attribute fields, such as background color, subject colors (mane color for a horse, wing color for a Pegasus, etc.), highlight colors, inclusions of accessories, and so forth. In some implementations, the token minting service 132 can select a specific attribute value for each attribute field ("background color=green") to form an attribute list. In such instances, the token minting service 132 can include the attribute list in the metadata and the token minting service 132 can combine image components associated with each of the selected attribute values to form a single image 142. In some implementations, the token minting service 132 can generate the image 142 in parallel with the second smart contract 152(2). In such instances, the token minting service 132 can store the image 142 in the data store 140, acquire the digital address for the image 142, and transmit the digital address to the second smart contract 152(2) for inclusion in the token 144.

The token 144 is a digital item stored in a distributed ledger. In some implementations, the token 144 is a non-fungible token that is uniquely identifiable and acts as a financial security. In various implementations, the ownership of the token 144 is recorded in the distributed ledger and is viewable to a group of users. In some implementations, each smart contract 152 can separately generate different tokens 144 (e.g., 144(1), 144(2), etc.) and/or different types of tokens 144. In various implementations the token 144 can include a reference to a separate file and/or dataset. For example, the token 144 can include an address corresponding to the digital location where the image 142 is stored.

The sensor devices 120 include one or more sensors that acquire various types of sensor data. In some implementations, the one or more sensors that acquire sensor data about a physical device, such as the physical token minter 110, where the acquired sensor data is not produced by the physical device and/or is not readily obtained from the physical device itself. Examples of such sensors include cameras, imaging sensors, location sensors, sound sensors, pressure sensors, vibration sensors, temperature sensors, humidity sensors, gyroscopes, accelerometers, and so forth. In various implementations, a processor included in the sensor device 120 executes techniques that enable one or more sensors to acquire sensor data.

For example, the location sensors can determine the physical location and/or orientation of the sensor devices 120. In another example, the sensor devices 120 can include microphones that acquire auditory data in the physical environment around the sensor device 120. In some implementations, a given sensor device 120 can include one or more applications and/or machine learning (ML) models to process the acquired sensor data. In such instances, a given sensor device 120 can include one or more ML models, where various sensor data is inputted into the one or more ML models that analyze the sensor data. For example, the sensor device 120 can input temperature data into a specific temperature anomaly detector in order to identify anomalies and/or other alert conditions associated with a target operating temperature of the physical token minter 110 or the surrounding environment.

In some implementations, the sensor device 120 acquires sensor data associated with the physical token minter 110 and/or physical interactions with the physical token minter 110. For example, the sensor device 120 can include a camera and/or rotational sensor that detects when a user pulls a mechanical lever to initiate the minting of a token. In such instances, the sensor device 120 can transmit the acquired sensor data to the sensor backend service 134 included in the remote server 130.

The remote server(s) 130 are one or more devices that provide backend services for other components of the token minting environment 100. In various implementations, a given remote server 130 operates one or more applications and/or services. For example, the remote server 130 can execute the token minting service 132, the sensor backend service 134, and the data analysis service 136. Additionally or alternatively, the remote server 130 can communicate with one or more of the sensor devices 120, the physical token minter 110, the client devices 106, and/or other devices included in the token minting environment 100. In various implementations, multiple remote servers 130 can execute distinct instances of the applications and/or services.

The token minting service 132 is a backend application that communicates with the client device 106 and the smart contracts 152 in order to mint tokens 144 in response to inputs provided by a user. In various implementations, the token minting service 132 connects with the client device 106 to establish a communication session. In such instances, the token minting service 132 can retrieve information about the digital wallet for the user via the wallet application 108. For example, the wallet application 108 can retrieve information about the digital wallet and can transmit the wallet information to the token minting service 132. Further, the token minting service 132 can exhaust the funds from the wallet by causing the funds to be transferred to another digital wallet. For example, the token minting service 132 can respond to a user initiating the minting process by exhausting a requisite amount of currency from the digital wallet and transferring the currency to a wallet associated with the token minting service 132 and/or a wallet associated with the smart contracts 152.

In various implementations, the token minting service 132 executes the smart contracts 152 to generate one or more tokens 144. In some implementations, the token minting service 132 can execute a given smart contract 152 by transmitting a message containing the applicable information to invoke the smart contract 152. For example, the smart contract 152(2) can be configured to generate a token 144 that includes a set of metadata. In such instances, the token minting service 132 could invoke the smart contract 152(2) by transmitting the metadata and other applicable information in a message to the smart contract 152. In some implementations, the token minting service 132 retrieves information from the smart contracts 152 and/or tokens 144 generated by the smart contracts 152. For example, the token minting service 132 can acquire an artifact generated by the smart contract 152(1) by querying the smart contract 152(1). Alternatively, the token minting service 132 can query a token 144, generated by the smart contract 152(1), that includes the artifact.

In various implementations, the token minting service 132 generates a set of metadata that is to be included in a token 144. For example, the token minting service 132 can generate a JavaScript Object Notation (JSON) file that includes information associated with a token 144, an image 142 linked to the token 144, and/or other information associated with the minting (e.g., identifier of the user that initiated the minting process, time and location information for the user performing the physical user interaction, etc.). In some implementations, the token minting service 132 can publish the metadata (not shown) by transmitting the metadata to the data store 140. Additionally or alternatively, in some implementations, the token minting service 132 can transmit the metadata or a subset of the metadata (e.g., an attribute list of selected attribute values) to a separate device to create a composite image corresponding to the subset of metadata.

In some implementations, the token minting service 132 operates on the remote server 130. In such instances, the physical token minter 110 can transmit messages to establish a token minting session that links actions that users perform via the physical token minter 110 with the operations of the token minting service 132. Alternatively, in some implementations, the physical token minter 110 can operate the token minting service 132 locally. In such instances, the token minting service 132 can control the minting interface 112 and can communicate with the data analytics application 114 in order to display dashboards and other information via the minting interface 112.

The sensor backend service 134 includes various services to manage the sensor device 120, including the registration, monitoring, reporting, and control of the sensor device 120. In various implementations, the sensor backend service 134 can include a suite of services and/or modules, such as a registration service, a service discovery module, a service provisioning module, and/or a sensor management service in order to register the sensor device 120. In some implementations, the sensor backend service 134 includes a sensor management service that receives and processes the acquired sensor data and/or the processed sensor data that is ingested by the sensor device 120.

In some implementations, the sensor device 120 can form a data stream with the sensor backend service 134. In such instances, the sensor backend service 134 can process, aggregate, filter, and/or secure the sensor data transmitted by the sensor device 120. Alternatively, the sensor device 120 can transmit a processed sensor dataset. In such instances, the sensor device 120 generating and transmitting the processed dataset in lieu of transmitting raw sensor data, the sensor devices 120 and/or the sensor backend service 134 can reduce the amount of sensor data that needs to be transmitted and accordingly, reduce consumption of network bandwidth.

The data analysis service 136 processes data associated with generating dashboards for various subscribers, such as the client device 106 and or the physical token minter 110. In various implementations, the data analysis service 136 ingests and processes various types of data transmitted by devices in the token minting environment 100. For example, in various implementations, the data analysis service 136 ingests telemetry data provided by the physical token minter 110. In another example, the data analysis service 136 can ingest data associated with and/or updates performed by the client device 106 in relation to dashboards displayed via a data analytics application (e.g., the data analytics application 114 that the physical token minter 110 executes).

In various implementations, the data analysis service 136 responds to data requests by retrieving field values via the data intake and query system 102. In an implementation, the field values are extracted from fields that are defined post-ingestion (e.g., at search time), as has been previously described (e.g., with a late-binding schema). The field values transmitted by data intake and query system 102 may be in any technically-feasible format. For example, the physical token minter 110 can request a dataset that includes processed telemetry data associated with the physical token minter 110 triggering the minting of multiple tokens 144. In such instances, the data analysis service 136 can retrieve the dataset by querying the data intake and query system 102 and transmitting the retrieved dataset to the physical token minter 110. In some implementations the data analytics application 114 operating on the physical token minter 110 can update the minting interface 112 with the data values included in the telemetry dataset.

Figure 2:
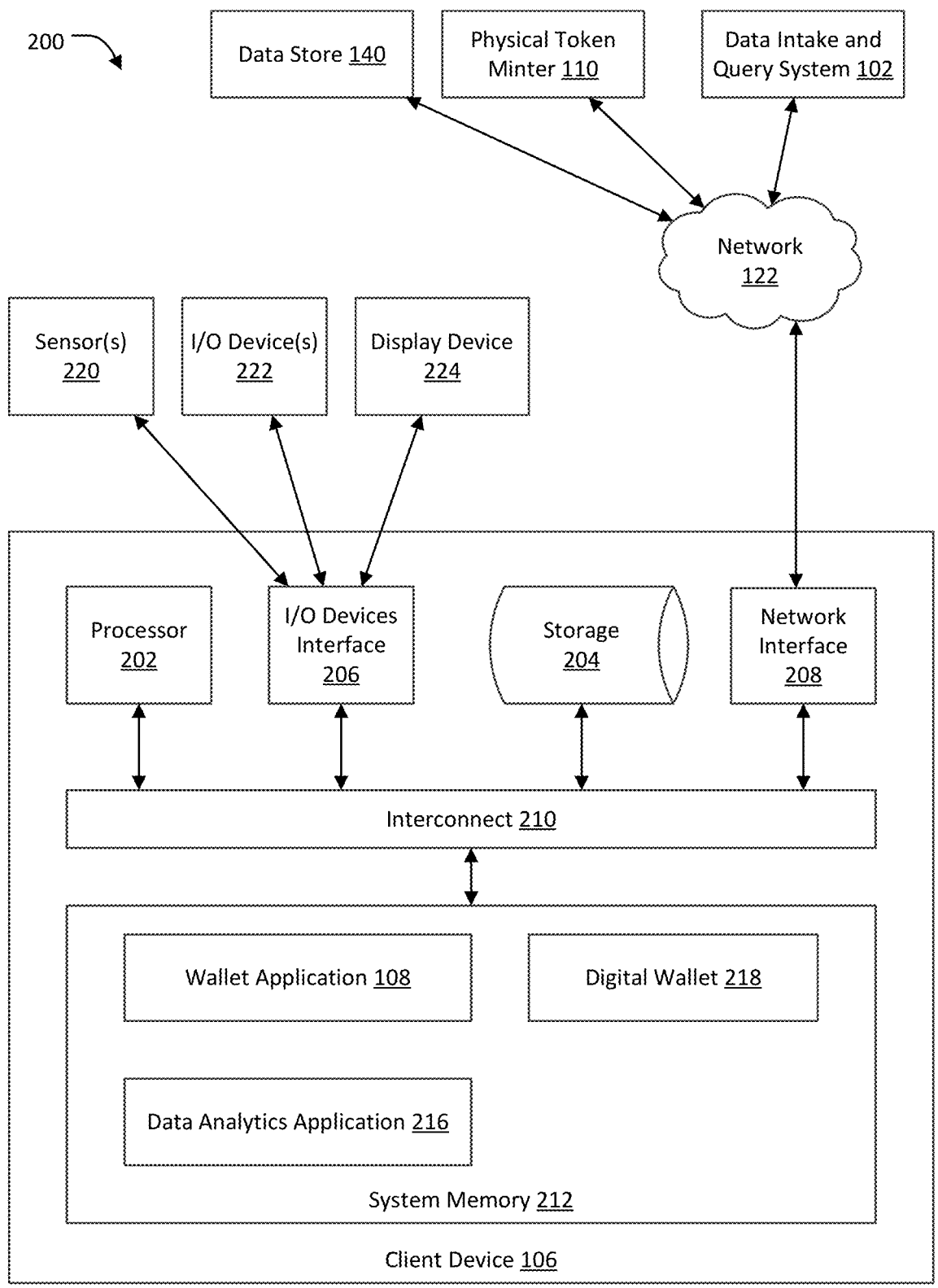
FIG. 2 illustrates a more detailed view of the example token minting environment of FIG. 1, in accordance with example implementations.

FIG. 2 illustrates a more detailed view of the token minting environment 100 of FIG. 1, in accordance with example implementations. As shown, the token minting environment 200 includes, without limitation, the data intake and query system 102, the physical token minter 110, the data store 140, and the client device 106 communicating with one another over the network 122. Examples of the client device 106 includes, without limitation, a mobile device (e.g., a smartphone, a tablet computer, a handheld computer, a wearable device, a portable media player, a virtual reality (VR) console, an augmented reality (AR) console, a laptop computer, a gaming device, and so forth. The client device 106 includes, without limitation, a processor 202, storage 204, an input/output (I/O) device interface 606, a network interface 608, an interconnect 210, and system memory 212. The system memory 212 includes, without limitation, the wallet application 108, a data analytics application 216 and a digital wallet 218.

In general, the processor 202 retrieves and executes programming instructions stored in the system memory 212. The processor 202 may be any technically-feasible form of processing device configured to process data and execute program code. The processor 202 could be, for example, a central processing unit (CPU), a graphics processing unit (GPU), an application-specific integrated circuit (ASIC), a field-programmable gate array (FPGA), and so forth. The processor 202 stores and retrieves application data residing in the system memory 212. The processor 202 is included to be representative of a single CPU, multiple CPUs, a single CPU having multiple processing cores, and the like. In operation, the processor 202 is the manager processor of the client device 106, controlling and coordinating operations of other system components.

The system memory 212 stores software application programs and data for use by the processor 202. For example, the system memory 212 could include, without limitation, the wallet application 108, the data analytics application 216, and/or a digital wallet 218. The processor 202 executes software application programs stored within the system memory 212 and, optionally, an operating system. In particular, the processor 202 executes software and then performs one or more of the functions and operations set forth in the present application.

The data analytics application 216 displays, computes, and/or generates data based on data received from the data intake and query system 102. In some implementations, the data analytics application 216 uses one or more identifiers to retrieve field values, extracted from events, which are associated with a specific object or environment. In various implementations, the client device 106 and/or the data intake and query system 102 may generate content (e.g., schemas, dashboards, cards, and/or visualizations) based on the extracted field values.

In various implementations, the data analytics application 216 retrieves data by querying a field-searchable data store included in the network. For example, the data analysis application 216 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data analysis application 216 could implement the data intake and query system 102 in order to extract one or more fields of data from a field-searchable data store. In such instances, the data analysis application 216 could retrieve the extracted fields as portions of a text string, such as: 2018-07-28 00:07:01,741 INFO [async_client][async_client][async_post_request][16574]POST headers={'Authorization': u'SplunkM4q2ROpGJC png41 W i8JJsyV1yGIxrIhI__1UsIUxvVk3m_I12q6Q43 Drf7P68v8H68kvQ7RHgA2eJz5o-LSnw4dOOyw EsTodOD0jdWDNGhj9zFGN-RuCiBWovEyXnO25X3_ aNjSwyO_rE_ik7', Content-Type: app lication/json'}, uri=https://127.0.0.1:4089/servicesNS/nobody/spacebridge-app/storage/collections/data/alert_recipient devices, params=None, data={"py/object": "spacebridge app.data.alert_data. RecipientDevice", "timestamp": "1132736421.201776", "alert_id": "5b5bb3 a540db2133e603d33f", "device_id": "y+DJALQwOXERwVDBzUe340ya1MINAId0IPzRB dtt51U="}host=ip-10-0-240-141 source=/opt/splunk/var/log/splunk/spacebridge-app.log sourcetype=spacebridge-app-too_small.

In some implementations, the data intake and query system 102 may send messages to the data analysis application 216 in accordance with a push notification service (not shown), such as the APPLE® Push Notification service (APN), or GOOGLE® Cloud Messaging (GCM). For example, the data analysis application 216 could receive various schemas, dashboards, playbooks, runbooks, cards, and/or visualizations that include real-time data associated with a particular machine and/or set of field-searchable events.

The digital wallet 218 can be a copy or a representation of a digital wallet that is stored in a remote device or in a remote service (cloud storage). Alternatively, in some implementations, the digital wallet 218 can be stored locally without copies in other devices. In such instances, the token minting service 132 can link to the digital wallet 218 when establishing a session with the wallet application 108.

The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). The processor 202 communicates to other computing devices and systems via the network interface 608, where the network interface 608 is configured to transmit and receive data via one or more communications networks 122.

The interconnect 210 facilitates transmission, such as of programming instructions and application data, between the processor 202, the input/output (I/O) device interface 606, the storage 204, the network interface 608, and the system memory 212. The I/O device interface 606 is configured to receive input data from user I/O devices. These I/O devices include, without limitation, sensor(s) 220 (e.g., one or more cameras, location sensor(s), etc.), input device(s) 222 (a keyboard, stylus, microphone, etc.), and/or a display device 224. The display device 224 generally represents any technically-feasible means for generating an image for display. For example, the display device 224 could be a liquid crystal display (LCD) display, an organic light-emitting diode (OLED) display, or a digital light processing (DLP) display. The sensor 220, such as a camera, acquires images via a lens and converts the images into digital form. The images acquired by the camera may be stored in the storage 204 and/or the system memory 212. An acquired image may be displayed on the display device 224, either alone or in conjunction with one or more other acquired images, graphical overlays, and/or other data.

The sensor(s) 220 may include location sensors that enable the client device 106 to determine the physical location and/or orientation of the client device 106. In some implementations, the location sensor(s) may include a network-based sensor that communicates with the data intake and query system 102 via the network 122, which may be part of a production-monitoring network. In some implementations, the location sensor(s) may include a network-based sensor that communicates with one or more data intake and query systems 102 via a local area network (LAN) and/or a wide area network (WAN). In various implementations, the token minting environment 100 can include multiple objects (e.g., the physical token minter 110) and/or multiple client devices 106. Each of the client devices 106 may communicate with a data intake and query system 102, and each of the client devices 106 is capable of identifying one or more objects based on identifier tags, geofences, and/or any other object-identification technique disclosed herein.

The I/O devices 222 can include a microphone that acquires audio signals for storage and analysis. Additional examples of user I/O devices 222 (not explicitly shown) may include one or more buttons, a keyboard, and a mouse or other pointing device. The I/O device interface 206 may also include an audio output unit configured to generate an electrical audio output signal, and the additional user I/O devices 222 can further include a speaker configured to generate an acoustic output in response to the electrical audio output signal.

Figure 3:
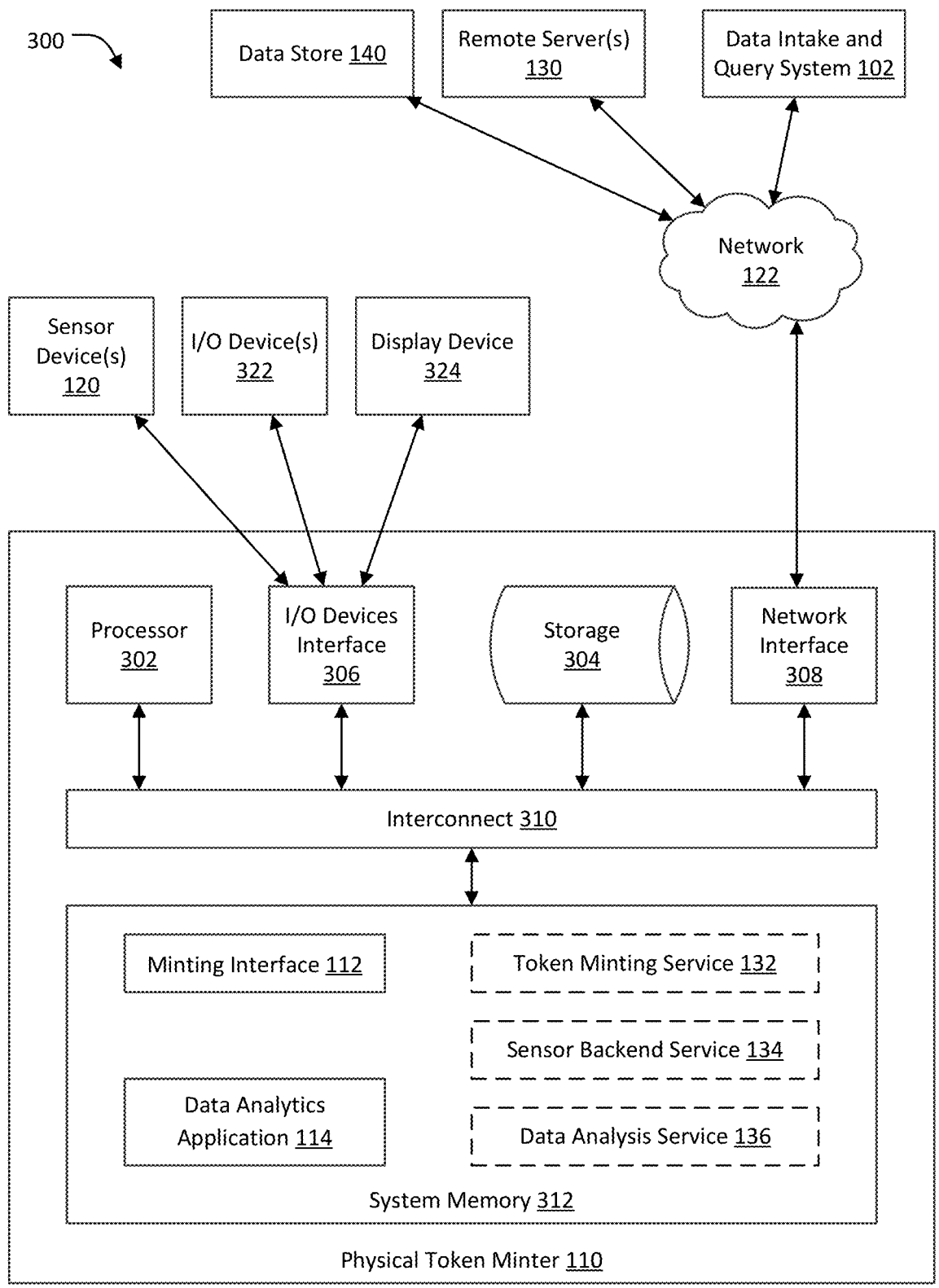
FIG. 3 illustrates another more detailed view of the example token minting environment of FIG. 1, in accordance with example implementations.

FIG. 3 illustrates another more detailed view of the token minting environment 100 of FIG. 1, in accordance with example implementations. As shown, the data processing environment 300 can include, without limitation, a data intake and query system 102, remote servers 130, a data store 140, and a physical token minter 110 communicating with one another over one or more networks 122. The physical token minter 110 includes, without limitation, a processor 302, storage 304, an input/output (I/O) device interface 306, a network interface 308, an interconnect 310, and system memory 312. The system memory 312 can include the minting interface 112, the data analytics application 114, the token minting service 132, the sensor backend service 134, and the data analysis service 136.

In general, the processor 302 may retrieve and execute programming instructions stored in the system memory 312. The processor 302 may be any technically-feasible form of processing device configured to process data and execute program code. The processor 302 could be, for example, a central processing unit (CPU), a graphics processing unit (GPU), an application-specific integrated circuit (ASIC), a field-programmable gate array (FPGA), and so forth. The processor 302 stores and retrieves application data residing in the system memory 312. The processor 302 is included to be representative of a single CPU, multiple CPUs, a single CPU having multiple processing cores, and the like. In operation, the processor 302 is the manager processor of the physical token minter 110, controlling and coordinating operations of the other system components.

The system memory 312 stores software application programs and data for use by the processor 302. For example, the system memory 312 could include, without limitation, the minting interface 112, the data analytics application 114, the token minting service 132, the sensor backend service 134, and the data analysis service 136. The processor 302 executes software application programs stored within the system memory 312 and optionally, an operating system. In particular, the processor 302 executes software and then performs one or more of the functions and operations set forth in the present application.

The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). The processor 302 communicates to other computing devices and systems via the network interface 308, where the network interface 308 is configured to transmit and receive data via one or more the communications network 122.

The interconnect 310 facilitates transmission, such as of programming instructions and application data, between the processor 302, the input/output (I/O) device interface 306, the storage 304, the network interface 308, and the system memory 312. The I/O device interface 306 is configured to receive input data from one or more I/O devices 322.

These I/O devices 322 include, without limitation, one or more external and/or internal sensor(s) (e.g., one or more sensor devices 120, cameras, location sensor(s), etc.), input device(s) 322 (e.g., a keyboard, stylus, microphone, mechanical levers, switches, etc.), and/or a display device 324. Additional examples of user I/O devices 322 (not explicitly shown) may include one or more buttons, a keyboard, and a mouse or other pointing device. The I/O device interface 606 may also include an audio output unit configured to generate an electrical audio output signal, and the additional user I/O devices 322 may further include a speaker configured to generate an acoustic output in response to the electrical audio output signal.

The display device 324 generally represents any technically-feasible means for generating an image for display. For example, the display device 324 may be a liquid crystal display (LCD) display, organic light-emitting diode (OLED) display, or a digital light processing (DLP) display. The sensor device 120, such as camera, acquires images via a lens and converts the images into digital form. The images acquired by the camera may be stored in the storage 204 and/or the system memory 212. An acquired image may be displayed on the display device 224, either alone or in conjunction with one or more other acquired images, graphical overlays, and/or other data.

Figure 4A:
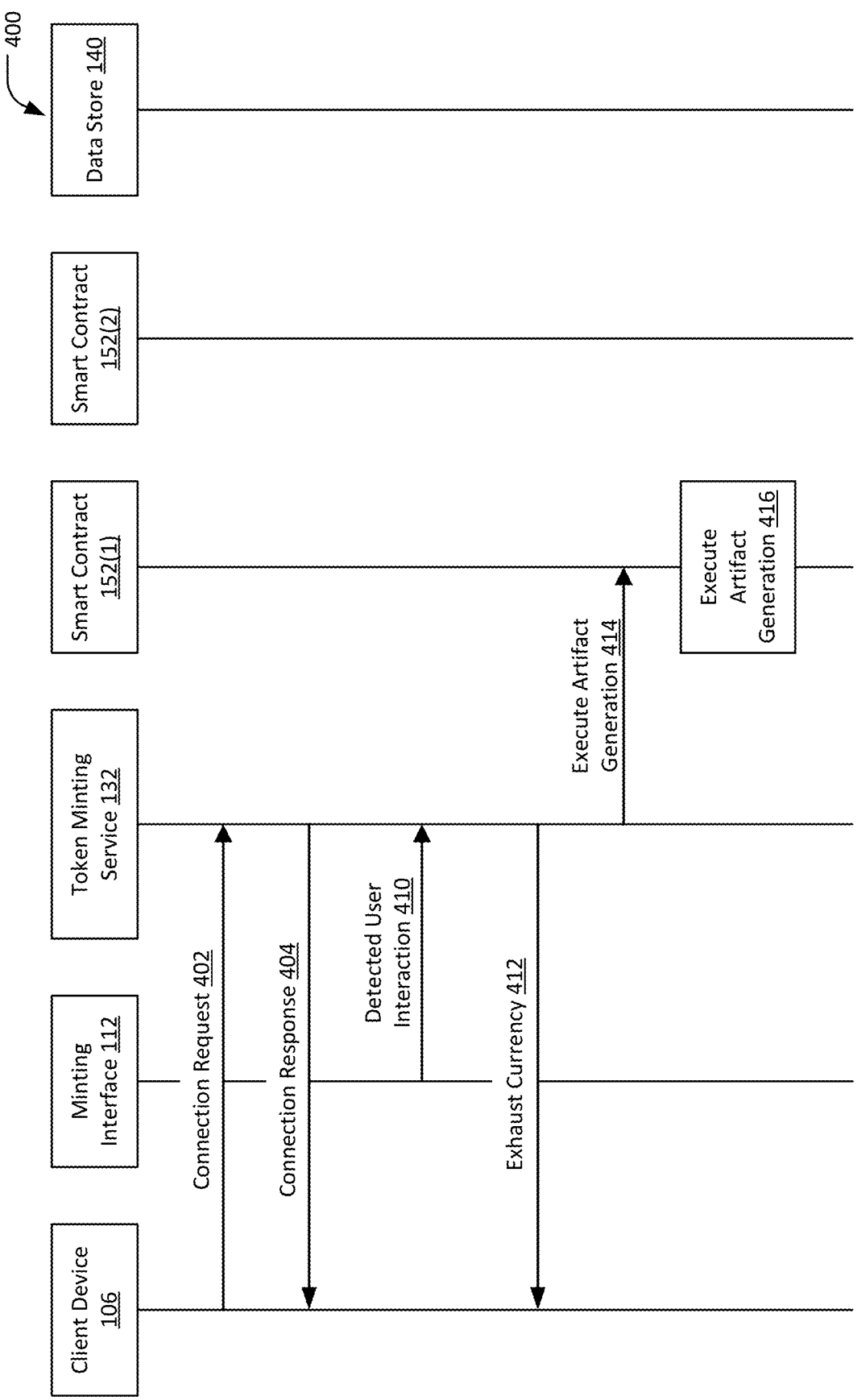
FIGS. 4A-4B sets forth a call flow diagram showing a set of interactions between various components of the example token minting environment of FIG. 1, in accordance with example implementations.
Figure 4B:
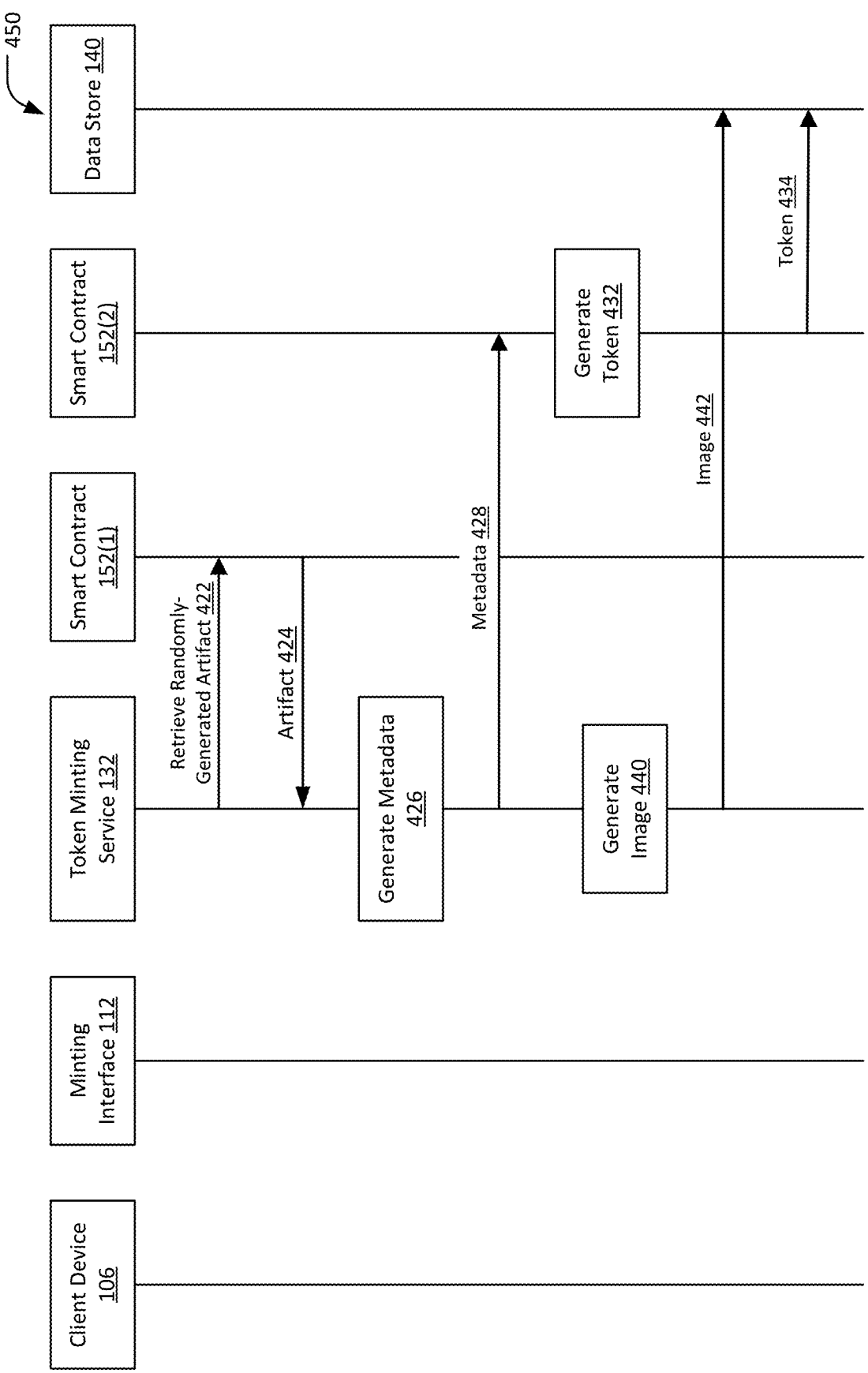

FIGS. 4A-4B sets forth call flow diagrams 400, 450 showing a set of interactions between various components of the token minting environment 100 of FIG. 1, in accordance with example implementations. One or more components of the token minting environment 100 perform various operations, including minting a non-fungible token 144 and generating an image 142 associated with the token 144. Although the interactions between devices are shown in an order, persons skilled in the art will understand that the interactions can be performed in a different order, interactions can be repeated or skipped, and/or can be performed by components other than those described in FIGS. 4A-4B.

As shown in FIG. 4A, the client device 106 transmits a connection request message 402 requesting to establish a session with the token minting service 132. The token minting service 132 responds by generating a connection response message 404. In some implementations, the token minting service 132 checks various conditions associated with the client device 106 before accepting the connection request. For example, the token minting service 132 can accept the request to establish a session only when the client device 106 is physically proximate to the physical token minter 110. In such instances, the token minting service 132 can generate a connection response message 404 that contains an error notification when the conditions are not met. Otherwise, in various implementations, when the token minting service 132 accepts the connection request, the connection response message 404 can include a notification that the client device 106 is coupled to the token minting service 132.

During the token minting process, in various implementations, the physical token minter 110 detects 410 one or more user interactions. For example, the physical token minter 110 can include or be coupled to a lever that, when pulled beyond a threshold angle, generates a signal indicating a lever pull. In such instances, the token minting service 132 receives the signal from the lever and determines that the user pulled the lever. In some implementations, the user can perform other types of interactions. For example, the physical token minter 110 can receive signals and/or messages associated with other types of user interactions. The interactions can include physical interactions with other types of physical inputs (e.g., switches, buttons, digital crowns, pulleys, knobs, pressure areas, etc.), physical movements (e.g., waving of arms that is captured by the sensor device 120, speaking an activation phrase, looking at a target, etc.), and or other types of physical inputs that the user provides.

When the token minting service 132 determines that the user performed a physical interaction that initiates the token minting process, the token minting service 132 attempts to exhaust 412 the requisite currency needed to initiate the creation of the token 144. In various implementations, the token minting service 132 can connect to the wallet application 108 included in the client device 106 and determine the amount of funds included in the digital wallet. In some implementations, the token minting service 132 can check for a specific type of digital currency included in the digital wallet. For example, the digital wallet can include two types of digital currency: 2Ω of BUTTERCUP BUCKS and 0.005 ฿ of BITCOIN. In some implementations, the token minting service 132 can be configured determines the BUTTERCUP BUCKS included in the digital wallet and reject the minting of a token 144 when the amount of BUTTERCUP BUCKS does not meet the threshold (e.g., 5Ω), irrespective of the amount of funds available in a different type of currency.

Upon exhausting the currency by a specific amount, the token minting service 132 transmits a message 414 to a first smart contract 152(1) to invoke the generation of an artifact. In various implementations, the smart contract 152(1) can be published on a distributed ledger (e.g., a blockchain or sidechain of a main ledger) and can include portions of executable code. In various implementations, the smart contract 152(1) can respond to the receipt of an initiation message 414 by performing various actions 416 to generate an artifact. In some implementations, the message 414 can include authentication information. For example, the first smart contract 152(1) can be configured to generate an artifact only when specific criteria (e.g., specific user identification, location, time, etc.) are met. In such instances, the token minting service 132 can include the authentication information in the message 414 to trigger the first smart contract 152(1) to execute.

In various implementations, the artifact can be a randomly-generated number, such as a number retrieved from a random number generator, such as the Chainlink verifiable random function (VRF) service. In such instances, the token minting service 132 and/or other components can use the artifact as a variable in a formula and/or a seed in a process to make other determinations associated with the token. For example, the token minting service 132 can use the artifact as a variable in a formula to select a set of attribute values.

As shown in FIG. 4B, in various implementations, upon transmitting the message 414, the token minting service 132 begins to generate a set of metadata, including generating a set of attribute values based on the artifact. In some implementations, the token minting service 132 can generate a message 422 triggering the first smart contract 152(1) to retrieve the randomly-generated artifact. In some implementations, the message 422 can be a query executed on the first smart contract 152(1) to retrieve the artifact. In such instances, the first smart contract 152(1) can transmit a response message 424 that includes the artifact. Alternatively, in some implementations, the message 424 can be a message that is transmitted to an address of a separate portion of the blockchain that includes the randomly-generated artifact. In such instances, the token minting service 132 can retrieve the artifact from the specific address.

In various implementations, token minting service 132 generates a set of attribute values. In some implementations, the token minting service 132 can select, for each attribute field, a distinct attribute value from a set of available attribute values. In some implementations, the token minting service 132 can compute one or more formulas using the artifact in order to select an attribute value for a given attribute field. Alternatively, in some implementations, the token minting service 132 can use the artifact as a seed in a process to select specific attribute values.

For example, Table 1 lists a group of attribute types, and the attribute values that that are selected with varying probability, such as attribute values that are collectively selected commonly ("common," selected for approximately 60% of all images 142), rarely ("rare," 30%), sparsely ("ultra-rare," 9%), and hardly ever ("legendary," 1%).

| Attribute Type | Common (60%) | Rare (30%) | Ultra-Rare (9%) | Legendary (1%) |
|---|---|---|---|---|
| Background | Purple | Green | Hearts | Sky |
| Body Color | White, Black | Grey | Blue | Green |
| Patch Color | Black, Brown | Red | Blue | Orange |
| Mane Color | White | Pink | Grey | Rainbow |
| Wing Color | White | Black | Gold | Green |
| Flag Attribute | No | Rainbow | Hot | Dark |
| Accessory Attribute (Eye) | No | Glasses | Visor | Blackout |
| Accessory Attribute (Head) | None | Horn | Birthday Cap | Wizard Hat |
| Accessory Attribute (Mouth) | None | Lollipop | Mustache | Lips |

Table 1: Distribution Table of Attribute Values

In such instances, the token minting service 132 can use the retrieved artifact as an index to select from the distribution. In some implementations, each attribute value can be mapped to a set of specific numbers. In such instances, the token minting service 132 can use the artifact as a lookup to select the attribute values that are mapped to the artifact. For example, if the artifact is a randomly-generated number ("951142330"), then the token minting service 132 could retrieve a set of attribute values for each that were mapped to the number (e.g., attributes {purple, white, black, pink, rainbow, none, mustache}).

In various implementations, the token minting service 132 collects a set of metadata and transmits the set of metadata to other components. For example, the token minting service 132 can transmit the metadata to the second smart contract 152(2) in order to generate a token 144 that includes the metadata as part of the contents. Additionally or alternatively, the token minting service 132 can transmit the metadata to a separate device (not shown) that generates the image that includes the attributes. In various implementations, the token minting service 132 and/or the other can generate a given image 142 that includes a set of attribute values associated with a set of attribute fields. For example, the token minting service 132 can generate an image that has specific attribute values included in an attribute list included in the metadata.

In some implementations, the token minting service 132 can add other types of metadata to the set of metadata. For example, the token minting service 132 can add time and/or location information associated with the detected user interaction. For example, the token minting service 132 could add the GPS location and a clock time corresponding to the location of the physical token minter 110 and the time that the token minting service 132 detected the physical user interaction, respectively. In various implementations, the token minting service 132 can include other types of metadata, such as information associated with the client device 106 (e.g., device ID, device type, etc.), user information (digital wallet ID, user identifiers, user role, demographic information, etc.), and so forth. Upon generating the metadata, the token minting service 132 can transmit a message 428 containing the metadata to the second smart contract 152(2).

In various implementations, the second smart contract 152(2) can respond to the receipt of the metadata by minting 432 a token 144 that includes the metadata. In some implementations, the metadata can include the set of attribute values that are to be included in the image 142. Additionally or alternatively, in some implementations, the metadata can include the address of image 142 that is stored in the data store. In some implementations, when the metadata does not include the address of the image, the smart contract 152(2) can retrieve the address before publishing 434 the token 444 to the distributed ledger. In some implementations, a copy of the token 444 is stored in the data store 140.

In various implementations, the token minting service 132 generates 440 the image 142. In various implementations, the token minting service 132 generates an image by generating a set of layers and flattening the layers to form a single composite image. For example, the token minting service 132 can, for each attribute value, retrieve a layer that corresponds to selected attribute value (e.g., selecting the purple background as the first layer, selecting a layer containing a blank white body as the second layer, etc.), and can flatten the set of separate attribute layers to form the image 142. In some implementations, the token minting service 132 can transmit the set of attribute values to a separate device and/or separate application, such as an image editing application. In such instances, the separate device and/or application can generate the image 142 based on the set of attribute values. Additionally or alternatively, in some implementations, the device generating the image 142 can generate the image 142 in parallel with the second smart contract 152(2) generating the token 144.

Upon generating the image 142, the token minting service 132 can transmit a message 442 to the data store 140 to publish the image 142. In various implementations, the token minting service 132 can cause the generated image 142 to be published by transmitting a message 442 that causes the image to be stored in the data store 140. In such instances, the image 142 can be stored in a publicly-accessible address that is to be included in the token 144. In some implementations, the address can be a pre-determined address that the token minting service 132 acquires from the data store 140 prior to generating the image 142. In such instances, the token minting service 132 can include the address in the metadata before generating the image 142. The token minting service 132 can also transmit the image 142 to the data store 140 upon completion, where the data store enables one or more devices to access the image 142 using the pre-determined address. Alternatively, in some implementations, the data store 140 can transmit a message that includes the address where the image 142 is accessible. In such instances, the token minting service 132 can forward the message to the second smart contract 152(2) in order for the second smart contract 152(2) to include the metadata in the token 144.

In some implementations, the token minting service 132 can publish the image 142 and/or the token 144 on one or more devices and/or one or types of media. For example, the token minting service 132 can cause a display device 324 included in the physical token minter 110 to display a screen that includes the image 142. In another example, the physical token minter 110 can print the image 142 onto a physical medium, such as a paper, adhesive paper (e.g., stickers), clothing, bags, banners, and so forth. Additionally or alternatively, in some implementations, the token minting service 132 can transmit a message to the wallet application 108 included in the client device 106 to update a screen to display the image 142. In some implementations, the display device 324 and/or the client device 106 can display information associated with the token 144, such as a token identifier and/or a notification that the token has been recorded to the distributed ledger.

Figure 5:
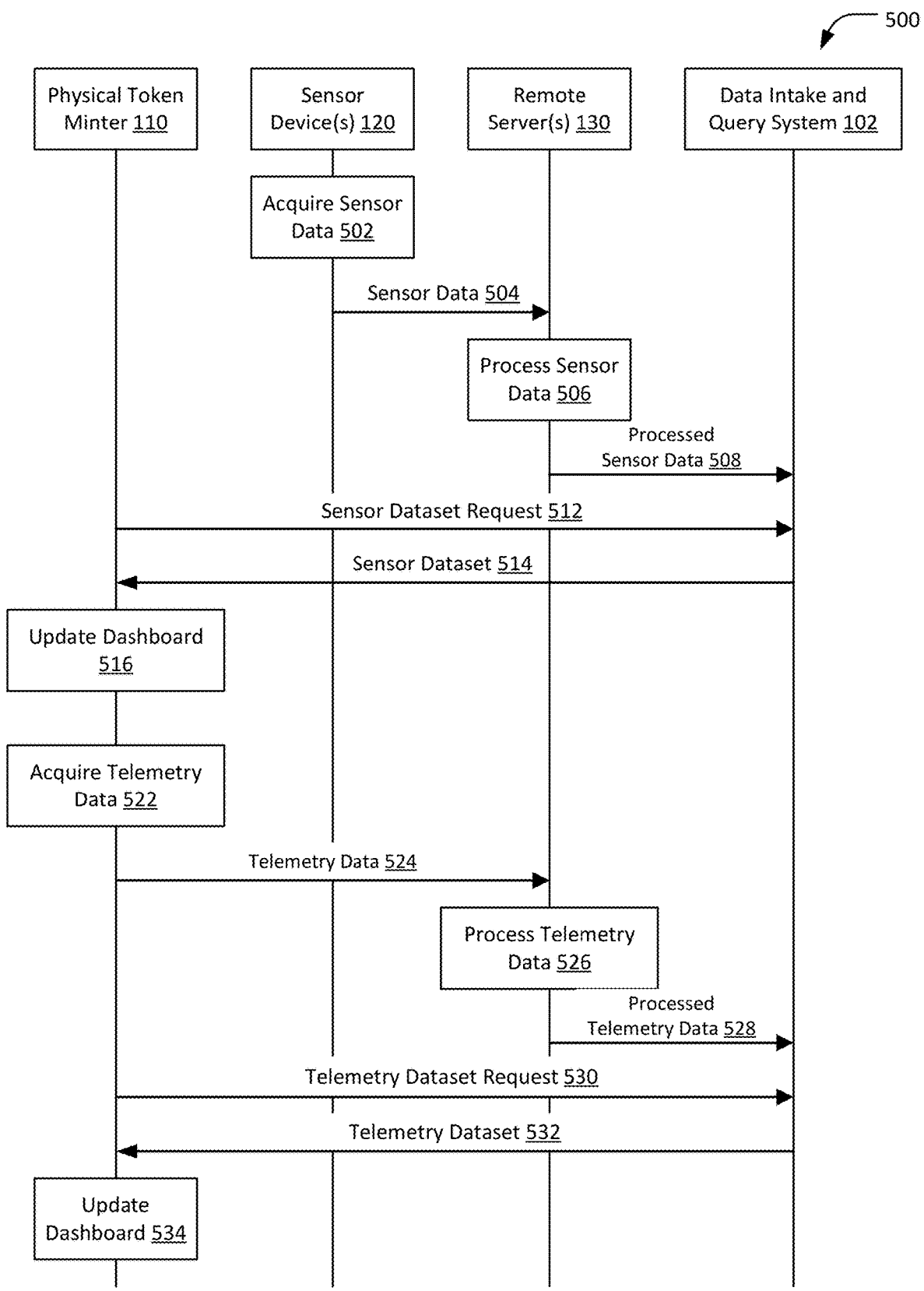
FIG. 5 sets forth a call flow diagram showing another set of interactions between various components of the example token minting environment of FIG. 1, in accordance with example implementations.

FIG. 5 sets forth a call flow diagram showing another set of interactions between various components of the example token minting environment 100 of FIG. 1, in accordance with example implementations. One or more components of the token minting environment 100 can perform various operations 500, including processing sensor data and telemetry data and presenting the processed data in one or more dashboards. Although the interactions between devices are shown in an order, persons skilled in the art will understand that the interactions can be performed in a different order, interactions can be repeated or skipped, and/or can be performed by components other than those described in FIG. 5.

One or more sensor devices 120 included in the token minting environment 100 acquire 502 sensor data from a physical environment. In various implementations, the one or more sensor devices 120 can include one or more sensors (e.g., motion sensors, cameras, temperature sensors, etc.) that collect sensor data about the physical environment. In some implementations, the sensor devices 120 can be included in the physical token minter 110 and/or can be proximate to the physical token minter 110. In such instances, the acquired sensor data can be related to the operation of the physical token minter 110 within a specific physical environment.

Upon acquiring the sensor data, the one or more sensor devices 120 transmit one or more messages 504 that include the sensor data. In various implementations, the one or more sensor devices 120 can be linked to the data analysis service 136 operating on the destination server 130. In some implementations, the sensor data can be grouped into various data sets and transmitted using multiple messages 504 that are part of a data stream between the sensor devices 120 and the remote server 130. In some implementations, the one or more sensor devices 120 can transmit the sensor data to the physical token minter 110. In such instances, the physical token minter 110 can transmit the messages 504 containing the sensor data to the remote server 130.

In various implementations, upon receiving the sensor data, the remote server 130 can perform various actions 506 to process the sensor data. In some implementations, the sensor backend service 134 can process the sensor data in real time. In such instances, the sensor backend service 134 can generate processed sensor data. Upon generating the processed sensor data, the sensor backend service 134 operating on the remote server 130 can forward 508 the processed sensor data in a message 528 to the data intake and query system 102 for storage.

In various implementations, one or more subscribers, such as the client device 106 and/or the physical token minter 110 can send a message 512 requesting a sensor dataset to the data intake and query system 102. In some implementations, the physical token minter 110 can send the message 512 in order to retrieve recent sensor data that was produced by the one or more sensor devices 120. In some implementations, the message 512 can include a dashboard identifier of a dashboard that is linked to the one or more sensor devices 120. In some implementations, the data intake and query system 102 can respond to the message 512 by identifying the applicable dashboard and/or the sensor data. In some implementations, the data intake and query system 102 can generate a dashboard that includes the visualizations, and sensor datasets that include data extracted from a field-searchable data store.

Upon processing request message 512, the data intake and query system 102 sends a response message 514 to the physical token minter 110. In various implementations, the response message 514 can include the dashboard linked to the one or more sensor devices 120. In some implementations, the response message 514 can include a sensor dataset associated with the sensor device 120, where the data set was retrieved by extracting field values from a data store.

In various implementations, the physical token minter 110 can perform various actions 516 to update the dashboard with the received sensor dataset. In some implementations, the physical token minter 110 can send subsequent requests to the data intake and query system 102 in order to receive a sensor dataset that includes field values for the dashboard. In such instances, the data intake and query system 102 may respond by transmitting a data response that includes the new data values that are applicable to the subsequent requests. Upon receiving the new additional data values, the physical token minter 110 can update the dashboard.

In various implementations, the physical token minter 110 can perform various actions 522 to acquire various telemetry data associated with the minting of various NFTs via the physical token minter 110. For example, the data analytics application 114 can aggregate telemetry data associated with the physical user interactions performed, the times that the physical interactions were performed, and the location of the physical token minter 110. In some implementations, the physical token minter 110 and/or the data analytics application 114 can generate telemetry data associated with the tokens 144 generated by the second smart contract 152(2). For example, the minting interface 112 can aggregate data associated with the attribute values associated with each set of metadata included in the tokens 144. Upon acquiring the telemetry data, the physical token minter 110 can transmit a message 524 that includes the acquired telemetry data.

In various implementations, upon receiving the telemetry data, the remote server 130 can perform various actions 526 to process the telemetry data. In some implementations, the data analysis service 136 can process the telemetry data in real time. In such instances, the data analysis service 136 can generate a set of processed telemetry data. In some implementations, the processed telemetry data can include generated values, such as an indicator of the rarest NFT based on the set of attribute values aggregated from the previously-generated tokens 144. Upon generating the processed sensor data, the data analysis service 136 operating on the remote server 130 can forward the processed telemetry data in a message 528 to the data intake and query system 102 for storage.

In various implementations, one or more subscribers, such as the client device 106 and/or the physical token minter 110 can send a message 530 requesting a telemetry dataset to the data intake and query system 102. In some implementations, the physical token minter 110 can send the message 530 in order to retrieve recent telemetry data that was processed by the data analysis service 136. In some implementations, the message 512 can include a dashboard identifier of a dashboard that is linked to the telemetry data (e.g., an NFT statistics dashboard). In some implementations, the data intake and query system 102 can respond to the message 530 by identifying the applicable dashboard and/or the telemetry data. In some implementations, the data intake and query system 102 can generate a dashboard that includes the visualizations, and telemetry datasets that include data extracted from the field-searchable data store.

Upon processing request message 530, the data intake and query system 102 sends a response message 532 to the physical token minter 110. In various implementations, the response message 514 can include the dashboard linked to the telemetry data. In some implementations, the response message 514 can include a telemetry dataset that was retrieved by extracting field values from a data store. In various implementations, the physical token minter 110 can perform various actions 534 to update the dashboard with the received telemetry dataset. In some implementations, the physical token minter 110 can send subsequent requests to the data intake and query system 102 in order to receive a telemetry dataset that includes field values for the dashboard. In such instances, the data intake and query system 102 can respond by transmitting a data response that includes the new data values that are applicable to the subsequent requests. Upon receiving the new additional data values, the physical token minter 110 can update the dashboard.

Figure 6:
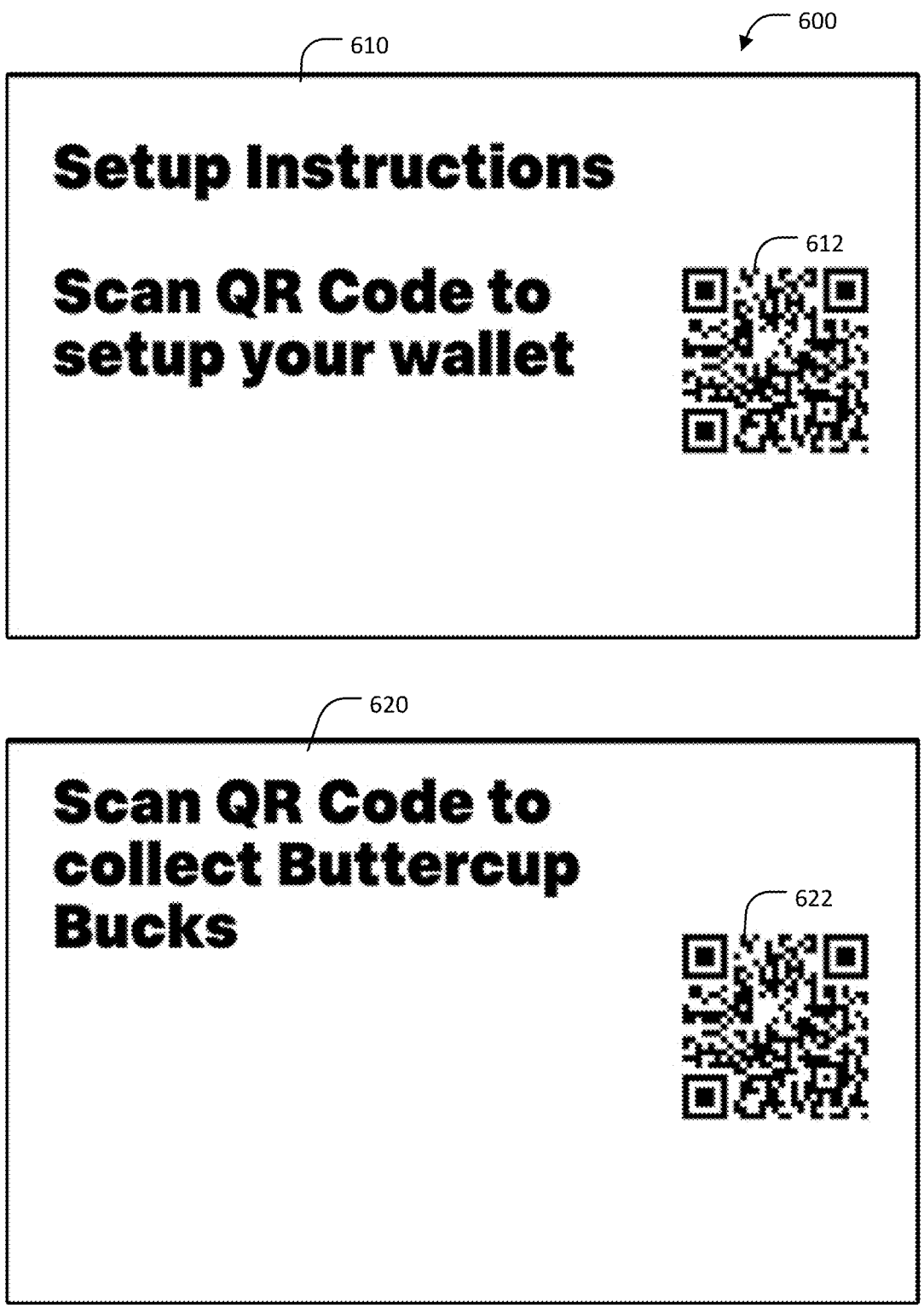
FIG. 6 illustrates example onboarding user interfaces for connection to the token minting environment of FIG. 1, in accordance with example implementations.

FIG. 6 illustrates example onboarding user interfaces 600 for connection to the token minting environment 100 of FIG. 1, in accordance with example implementations. In general, the physical token minter 110 can display one or more onboarding screens to enable a client device 106 to set up a digital wallet, collect a specific type of digital currency, and/or establish a session between the client device 106 and the physical token minter 110. For example, the physical token minter 110 can display a screen 610 containing a QR code 612 that encodes a link to download the wallet application 108 on the client device 106. In another example, the physical token minter 110 can display a screen 620 containing a QR code 622 that encodes a link to transfer a digital currency to the digital wallet of the user via the wallet application 108.

In some implementations, other devices within the token minting environment 100 can display the screens 610, 620. For example, one or more separate display devices 324 can display screens 610, 620, and/or other screens in a rotating cycle. Additionally or alternatively, the screens 610, 620 can be printed onto cards and physically provided to the user. In such instances, the user can scan the card and/or the QR code 612, 622 to download the wallet application 108 and/or the digital currency.

Figure 7:
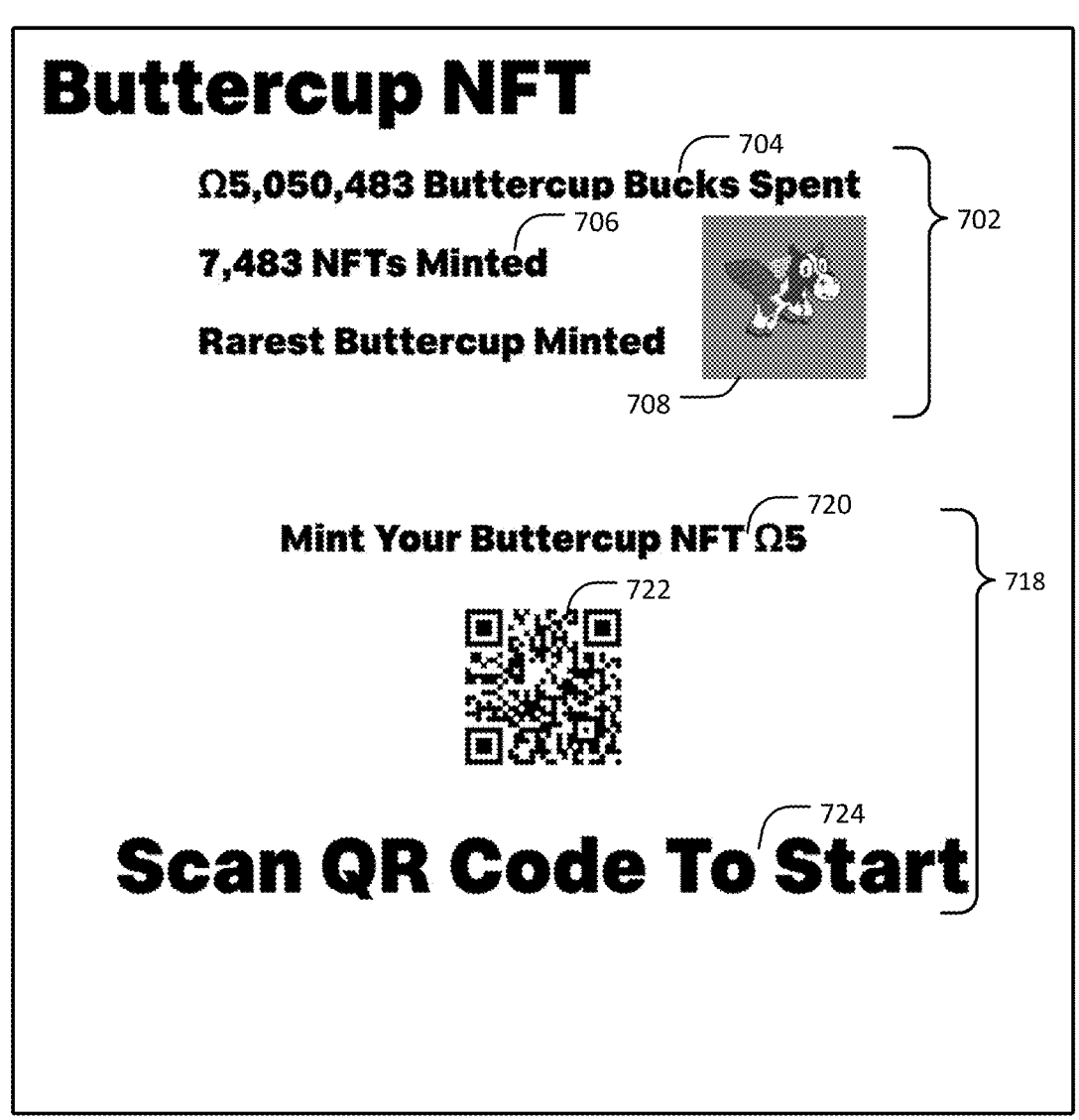
FIG. 7 illustrates an example welcome screen provided by the physical token minter in the token minting environment of FIG. 1, in accordance with example implementations.

FIG. 7 illustrates an example welcome screen 700 provided by the physical token minter 110 in the token minting environment of FIG. 1, in accordance with example implementations. As shown, the token minting service 132 in the physical token minter 110 can present the welcome screen 700 to enable the client device 106 to establish a session between the client device 106 and the physical token minter 110. In some implementations, the 110 can display a dashboard 702 over a portion of the welcome screen 700 that includes telemetry data acquired from the data intake and query system 102. For example, as shown, the welcome screen 700 includes a dashboard 702 that includes telemetry data associated with the usage of a specific digital currency, such as the amount of BUTTERCUP BUCKS spent 704, the number of tokens 144 minted 706, and an image 708 corresponding to the rarest set of attribute values included in a token 144.

In some implementations, the welcome screen 700 can also include an information section 718 that includes information 720 specifying the requisite currency required for a mint, a QR code 722 used to establish a session with the physical token minter 110, and instructions 724 to initiate a session with the physical token minter 110. In some implementations, the welcome screen 700 can include further instructions associated with performing a physical interaction to initiate the minting of a token. In such instances, the physical token minter 110 can alternately display the information portion when the physical token minter 110 is not in a session with a specific client device 106.

Figure 8:
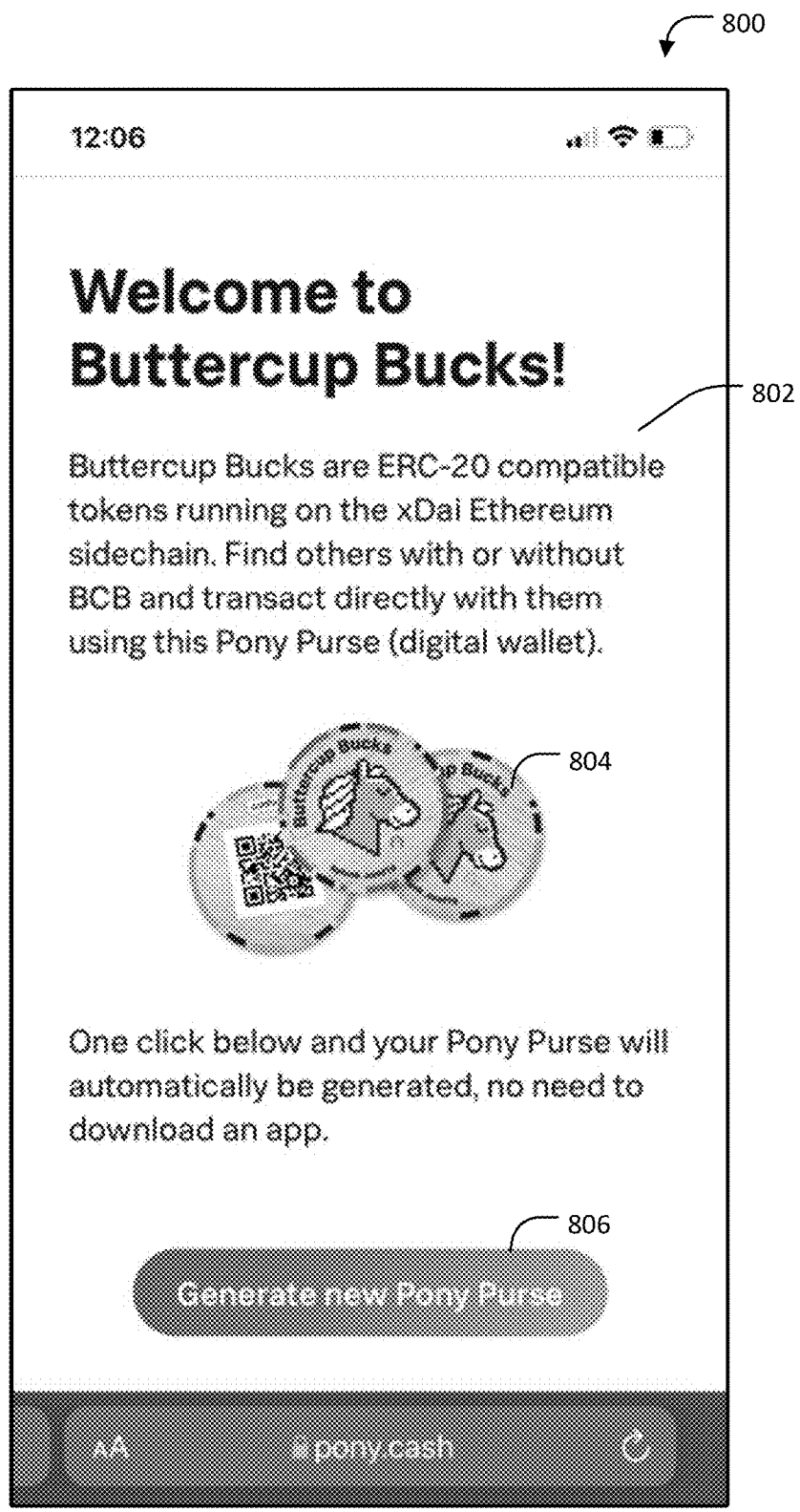
FIG. 8 illustrates an example welcome screen provided by the wallet application in the token minting environment of FIG. 1, in accordance with example implementations.

FIG. 8 illustrates an example welcome screen 800 provided by the wallet application 108 in the token minting environment of FIG. 1, in accordance with example implementations. In general, the wallet application 108 is linked to the digital wallet of the user and establishes a session with the physical token minter 110 in order for the token minting service 132 to acquire funds from the digital wallet and initiate the minting of the token 144.

In various implementations, the wallet application 108 can display the welcome screen 800 upon downloading the wallet application 108 and/or downloading a wallet dashboard via the data analytics application 216. In various implementations, the welcome screen 800 can include information 802 about the digital wallet and/or the digital currency 804 used by the physical token minter 110 for the minting of the token 144. In some implementations, the welcome screen 800 can include representations of the digital currency and a button 806 to generate a digital wallet to store the digital currency. For example, the wallet application 108 can provide instructions for the user to generate a digital wallet that holds a specific type of digital currency.

Figure 9:
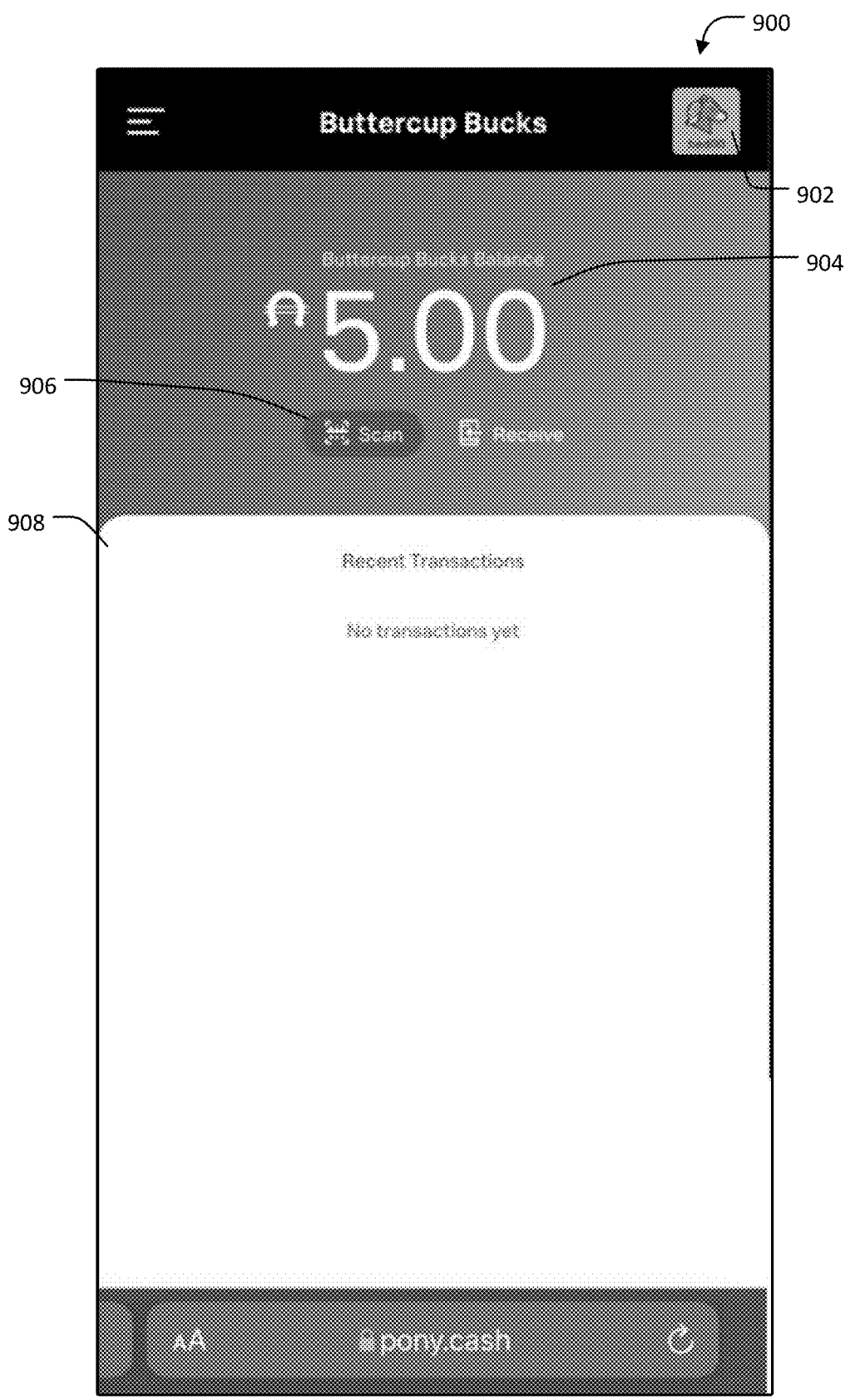
FIG. 9 illustrates a wallet interface screen provided by the wallet application in the token minting environment of FIG. 1, in accordance with example implementations.

FIG. 9 illustrates a wallet interface screen 900 provided by the wallet application in the token minting environment 100 of FIG. 1, in accordance with example implementations. As shown, the wallet interface screen 900 includes a wallet identifier 902, a digital wallet balance 904, a set of action buttons 906, and a notification area 908.

In various implementations, the wallet application 108 can connect to the digital wallet stored in one or more devices storing a copy of the digital wallet and can acquire data associated with the digital wallet. In such instances, the wallet application 108 can display the information via the wallet interface screen 900. In some implementations, the wallet application 108 can transmit the information associated with the digital wallet to the physical token minter 110. For example, when the physical token minter 110 determines whether the digital wallet contains sufficient funds of the digital currency, the wallet application 108 can transmit the digital wallet balance 904 to the physical token minter 110.

In various implementations, the wallet interface screen 900 can display the unique wallet identifier 902 and a set of notifications associated with the wallet identifier 902 within the notification area 908. For example, the wallet application 108 can list a set of previous transactions associated with the unique wallet identifier 902, such as transactions that the user performed to acquire amounts of the digital currency. In some implementations, the notification area can display previous images and/or tokens that are in the digital wallet. In such instances, the tokens included in the digital wallet can be used as badges (e.g., signifying where and when the user minted the token) and/or unique identifiers (e.g., when the token 144 is non-transferable) associated with the user acquiring the tokens 144.

Figure 10:
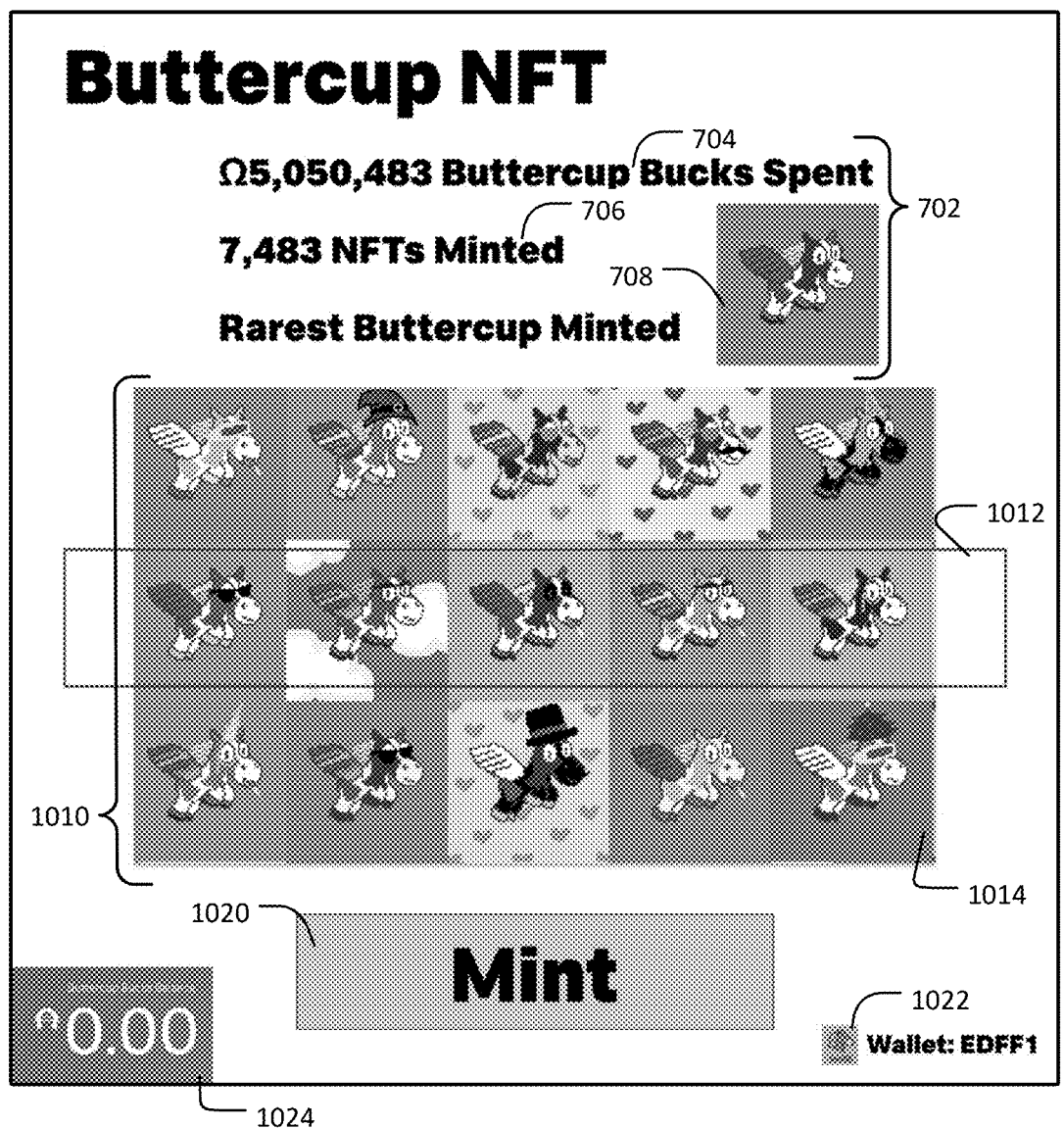
FIG. 10 illustrates an example minting screen provided by the physical minting device in the token minting environment of FIG. 1, in accordance with example implementations.

FIG. 10 illustrates an example minting screen 1000 provided by the physical minting device in the token minting environment of FIG. 1, in accordance with example implementations. In general, the token minting service 132 can display the minting start screen during a session with the client device 106 before the user performs the interaction to trigger the physical token minter 110 to mint the token 144. As shown, the minting screen 1000 includes an information dashboard 702, a spinner section 1010 that includes a selection area 1012 and a set of candidate generative images 1014. The minting screen 1000 further includes a notification area that includes a minting initiation prompt 1020, a wallet identifier 1022, a digital wallet balance 1024.

In various implementations, upon establishing a session with the client device 106, the token minting service 132 can acquire information from the wallet application 108 and display the information as part of the minting screen 1000. For example, the minting screen can display the current wallet balance 1024 and the wallet identifier 1022 associated with the session. In such instances, a user can review the information on the minting screen to confirm that the information is correct. In some implementations, the minting screen 1000 can further include a minting prompt 1020 that the user selects before performing the physical user interaction. For example, the token minting service 132 can require that the user select the prompt 1020 and agree to a set of terms of agreement before performing a physical interaction to initiate the minting of the token 144.

In some implementations, the token minting service 132 can display a spinner section 1010 to animate the creation of the image 142. For example, the token minting service 132 can animate the spinner section 1010 by animating each column in the spinner section 1010. In such instances, the token minting service 132 can animate the spinner section in a manner to emulate a slot machine during operation. In various implementations, the token minting service 132 can animate the spinner section to correspond with the token minting service 132 creating the image 142 and/or the second smart contract 152(2) generating the token 144. In some implementations, the token minting service 132 can first acquire the generated image 142 before animating the spinning section 1010. In such instances, the generated image 142 can be included as a candidate image 1014 that is included in each column. Alternatively, in some implementations, the token minting service 132 can animate the spinning section 1010 when the token minting service 132 begins to generate the image 142 and can add the image 142 to the set of candidate images 1014 while the animation is occurring.

Figure 11:
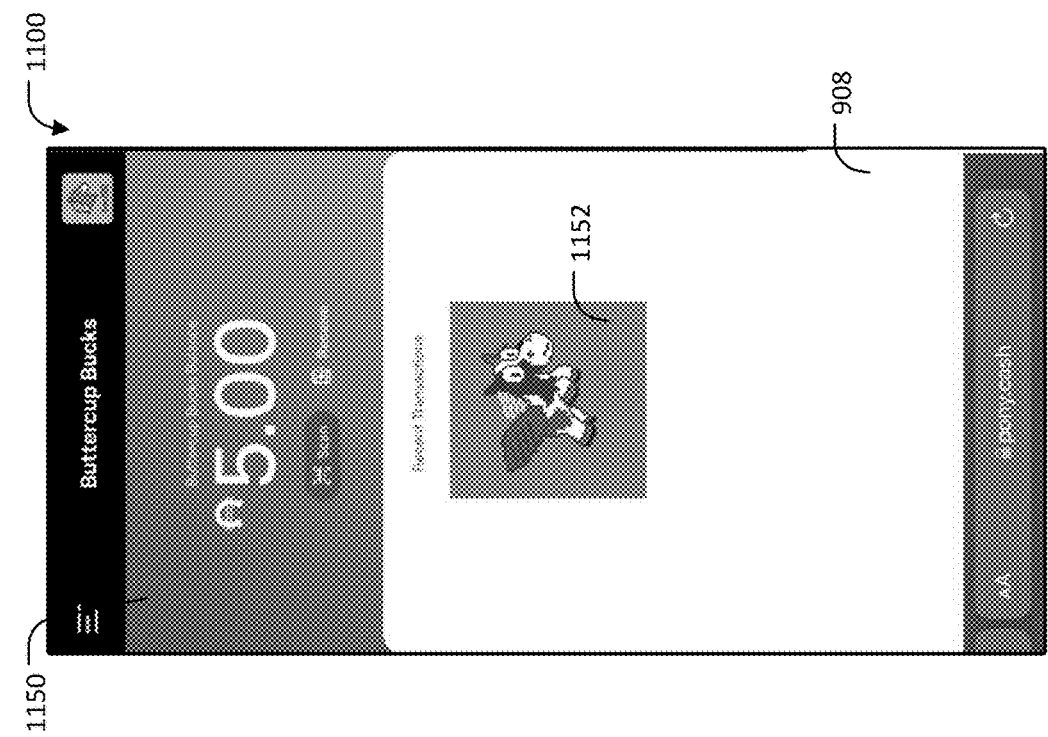
FIG. 11 illustrates example interface screens notifying a completion of a minted token in the token minting environment of FIG. 1, in accordance with example implementations.
Figure 11:
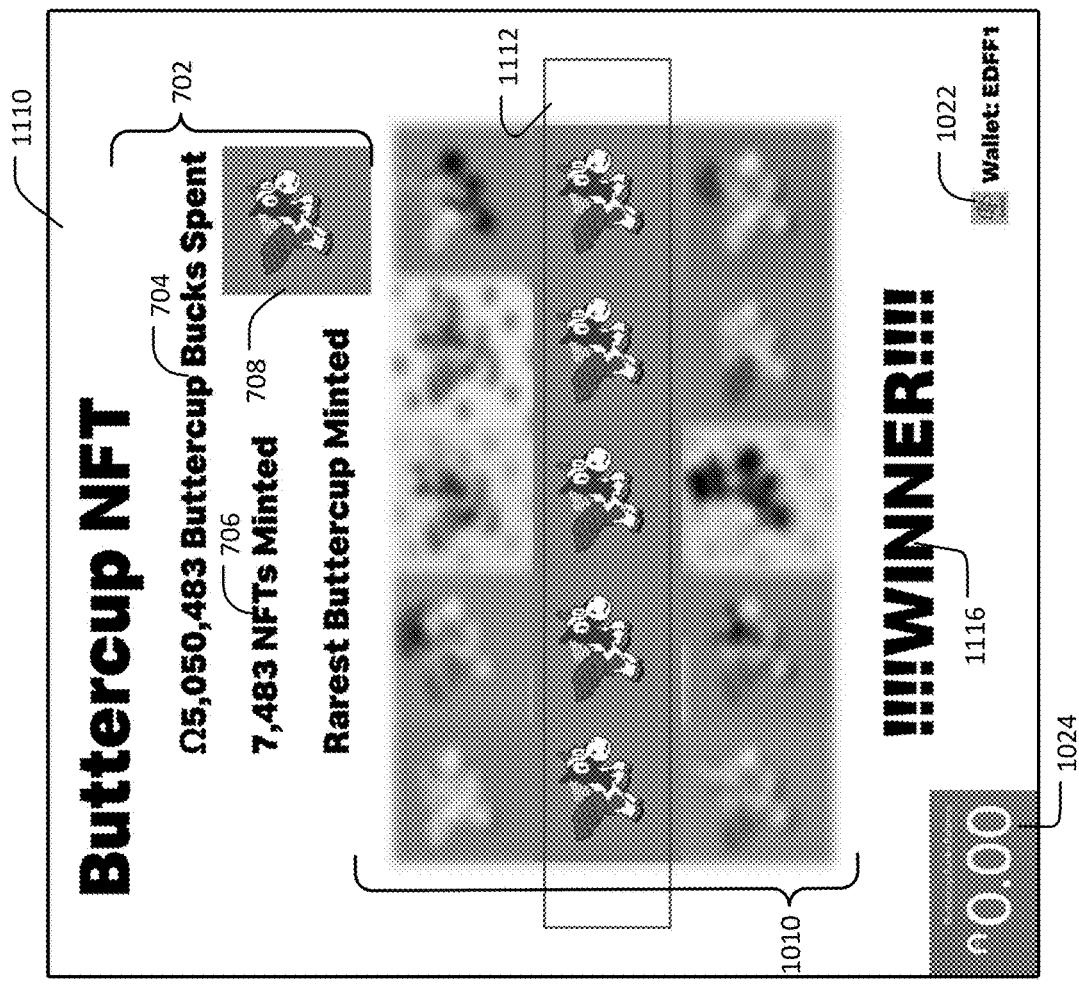

FIG. 11 illustrates example interface screens 1100 notifying a completion of a minted token in the token minting environment 100 of FIG. 1, in accordance with example implementations. In general, the token minting service 132 can cause the physical token minter 110 to display the minting complete screen 1110 during a session with the client device 106 after the second smart contract 152(2) created the token 144 and/or the token minting service 132 generated the image 142. Additionally or alternatively, the token minting service 132 can transmit a message to the wallet application 108 to cause the wallet application 108 to update the notification area 908 to include information about the image 142 and/or the token 144.

As shown, the token minting service 132 updates the minting screen 1000 to the minting complete screen 1110 upon the image 142 being generated. In some implementations, the token minting service 132 can update the minting screen 1000 upon receiving a notification that the second smart contract 152(2) generated the token 144. In some implementations, the token minting service 132 can respond to the reception of the image 142 and/or the notification associated with the token 144 by slowing the animation of the spinning section until each column stops to display in the selection area 1112 the image 142 that was generated with the metadata created in response to the user interaction. In some implementations, the token minting service 132 can display a notification 1116 that the minting is complete. For example, when the spinning section 1010 is emulating a slot machine, the token minting service 132 can display a corresponding notification 1116 to emulate the completion of a slot machine engagement.

In various implementations, the token minting service 132 can cause the wallet application 108 to update the wallet interface screen 900 to display information about the minted token 144. For example, the token minting service 132 can transmit the address for the location of the image 142 and/or information about the token 144. In such instances, the wallet application 108 can update the notification area 908 to display a representation 1152 of the image 142 and/or information included in the token 144.

Figure 12:
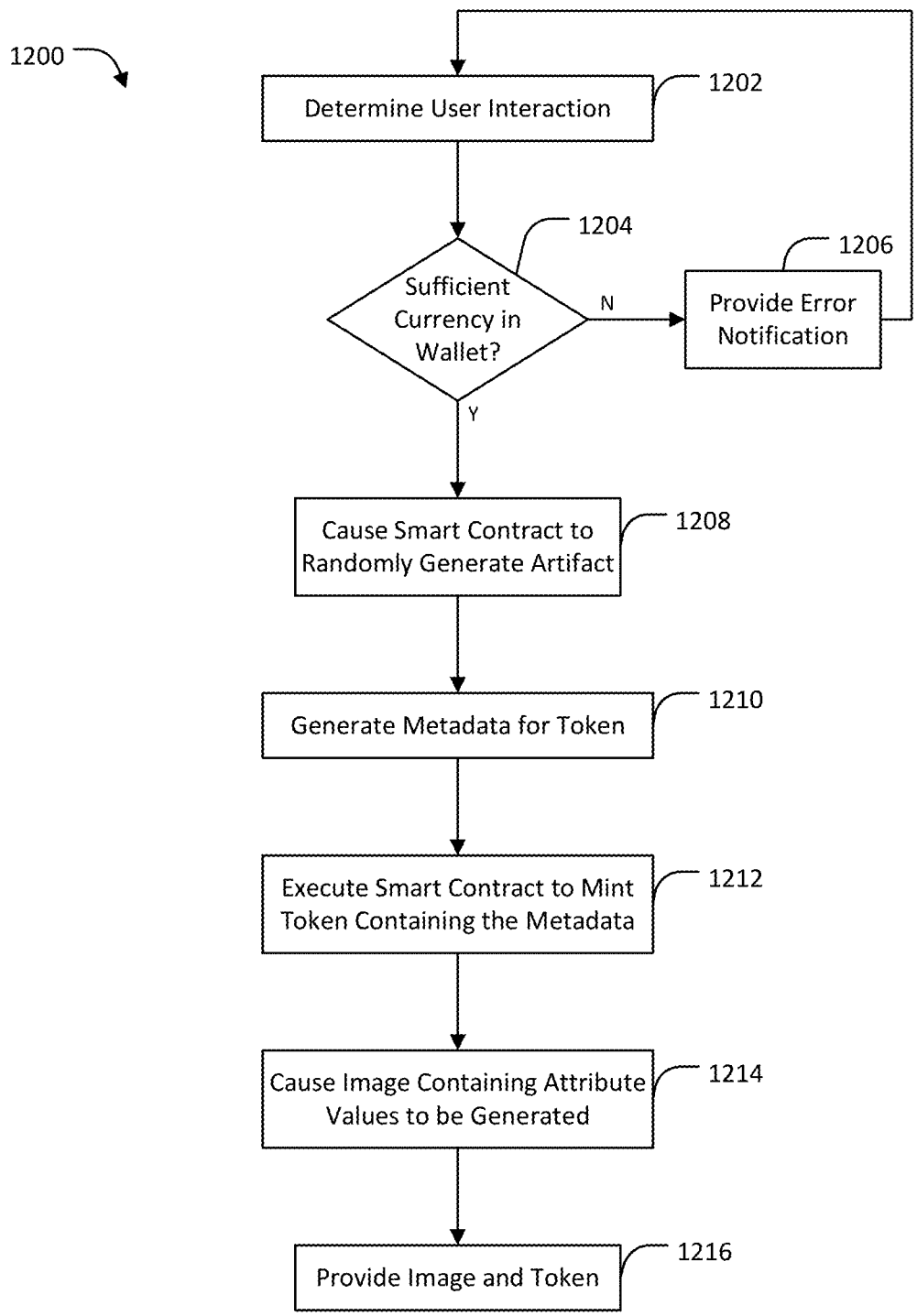
FIG. 12 sets forth a flow diagram of method steps for minting a non-fungible token in response to a detected physical user interaction in the token minting environment of FIG. 1, in accordance with example implementations.

FIG. 12 sets forth a flow diagram of method steps for minting a non-fungible token in response to a detected physical user interaction in the token minting environment 100 of FIG. 1, in accordance with example implementations. Although the method steps are described in conjunction with FIGS. 1-11, persons of ordinary skill in the art will understand that any system configured to perform this method and/or other methods described herein, in any order, and in any combination not logically contradicted, is within the scope of the present invention.

The example process 1200 can be implemented, for example, by a computing device that comprises a processor and a non-transitory computer-readable medium. The non-transitory computer readable medium can be storing instructions that, when executed by the processor, can cause the processor to perform the operations of the illustrated process 1200. Alternatively or additionally, the process 1200 can be implemented using a non-transitory computer-readable medium storing instructions that, when executed by one or more processors, case the one or more processors to perform the operations of the process 1200 of FIG. 12.

As shown, the method 1200 begins at step 1202, where the token minting service 132 determines whether a user interaction has occurred. In various implementations, the physical token minter 110 detects a user interaction associated with a trigger to mint a non-fungible token. In some implementations, the physical token minter 110 can include or be coupled to one or more input devices 322. In such instances, the user can physically interact with the input in order to trigger the physical token minter 110 to initiate the minting of an NFT, such as the token 144. For example, the physical token minter 110 can be attached to a lever that, when pulled beyond a threshold angle, generates a signal. In such instances, the token minting service 132 can receive the signal and/or a message from physical token minter 110 indicating that the signal has been generated. In such instances, the token minting service 132 can determine that reception of the signal and/or the message indicates that the user interacted with the lever.

In some implementations, the user can perform other types of interactions that the physical token minter 110 detects. For example, the physical token minter 110 can receive signals and/or messages associated with other types of user interactions. The interactions can include physical interactions with other types of physical inputs (e.g., switches, buttons, digital crowns, pulleys, knobs, pressure areas, etc.), physical movements (e.g., waving of arms that is captured by the sensor device 120, speaking an activation phrase, looking at a target, etc.), and or other types of physical inputs that the user provides.

At step 1204, the token minting service 132 determines whether the user has sufficient funds in a corresponding digital wallet. In various implementations, the token minting service 132 can attempt to exhaust a requisite currency needed to initiate the creation of the token 144. In some implementations, the token minting service 132 can connect to the wallet application 108 included in a client device 106 associated with the user. In such instances, the token minting service 132 can connect to the digital wallet associated with the user and determine the amount of funds included in the digital wallet. When the token minting service 132 determines that the digital wallet includes the sufficient funds, the token minting service 132 exhausts the requisite funds from the wallet and proceeds to step 1608.

Otherwise, when the token minting service 132 determines that the digital wallet does not include the sufficient funds, the token minting service 132 proceeds to step 1206, where the token minting service 132 provides an error notification via the display device 322 coupled to the physical token minter 110 and/or via the client device 106. Upon providing the error message, the token minting service 132 proceeds to step 1202 to wait to detect a further user interaction.

At step 1208, the token minting service 132 executes a smart contract to create an artifact. In various implementations, the token minting service 132 can execute a first smart contract 152(1) by transmitting a message 414 to a first smart contract 152(1). In some implementations, the first smart contract 152(1) can respond to the receipt of the message 414 by creating an artifact. The artifact can be a randomly-generated number, such as a number retrieved from a random number generator. In such instances, the token minting service 132 and/or other components can use the artifact to create metadata and/or associate the metadata with the digital wallet of the user. In some implementations, the first smart contract 152(1) can generate a first token (e.g., 144(1)) that maps the artifact to the wallet identifier for the digital wallet. In such instances, the artifact can be associated with multiple tokens, including a second token (e.g., 144(2)) that includes metadata created using the artifact.

At step 1210, the token minting service 132 generates metadata to be included in a token. In various implementations, the token minting service 132 can generate a set of metadata that is to be included in a token associated with an image 142. In some implementations, the token minting service 132 can include various types of metadata in the set of metadata. For example, the token minting service 132 can add time and/or location information associated with the detected user interaction. For example, the token minting service 132 could add the GPS location and a clock time corresponding to the location of the physical token minter 110 and the time that the token minting service 132 detected the physical user interaction, respectively. In various implementations, the token minting service 132 can include other types of metadata, such as information associated with the client device 106 (e.g., device ID, device type, etc.), user information (digital wallet ID, user identifiers, demographic information, user role, etc.), and so forth. Upon generating the metadata, the token minting service 132 can transmit a message 428 containing the metadata to the second smart contract 152(2).

In some implementations, the token minting service 132 can collect a set of metadata and can transmit the set of metadata to other components. For example, the token minting service 132 can transmit the metadata to the second smart contract 152(2) in order to generate a token 144 that includes the metadata as part of the contents. Additionally or alternatively, the token minting service 132 can transmit the metadata to a separate device (not shown) that generates the image that includes the attributes. In various implementations, the token minting service 132 acquires the artifact that the first smart contract 152(1) generated. In some implementations, the token minting service 132 can query the first smart contract 152(1) and retrieve the artifact from the first smart contract 152(1). Alternatively, in some implementations, the message 424 query the token 144(1) generated by the first smart contract 152(1). In such instances, the token minting service 132 can retrieve the artifact by querying the token 144(1) directly.

In some implementations, token minting service 132 can generate a set of attribute values that are to be included in the set of metadata. In such instances, the token minting service 132 and/or another application can generate a given image 142 based on the attribute values. The resulting image 142 includes characteristics that correspond to the set of attribute values included in the set of metadata. For example, the token minting service 132 can generate an image that has a specific attribute value for each of a group of attribute fields. In some implementations, the token minting service 132 can select, for each attribute field, a distinct attribute value from a set of available attribute values. In some implementations, the token minting service 132 can compute one or more formulas using the artifact in order to select an attribute value for a given attribute field. Additionally or alternatively, in some implementations, the token minting service 132 can use the retrieved artifact as an index, seed, or key to select from a distribution of attribute values.

At step 1212, the token minting service 132 executes a smart contract to mint a token containing the set of metadata. In various implementations, the token minting service 132 can execute a second smart contract 152(2) by sending a message 428 to the second smart contract 152(2). In some implementations, the second smart contract 152(2) can receive a message 428 that includes the metadata. In such instances, the second smart contract 152(2) can extract the metadata from the message 428 and include the metadata in a new token 144(2). Alternatively, in some implementations, the second smart contract 152(2) can respond to the message 428 by acquiring the metadata from the token minting service 132. In various implementations, the token 144(2) links the metadata to the wallet identifier for the digital wallet. In some implementations, the second smart contract 152(2) can provide a notification that the token 144(2) was created before publishing the token 144(2) to the distributed ledger. In such instances, the second smart contract 152(2) can provide a separate notification upon publishing the token 144(2) to the distributed ledger.

At step 1214, the token minting service 132 causes an image containing the attribute values to be generated. In various implementations, the token minting service 132 can create an image 142 that includes the set of attribute values included in the metadata. In such instances, the token minting service 132 can generate the image 142 by generating or selecting a set of attribute layers and flattening the layers to form a single image. For example, the token minting service 132 can, for each attribute value, retrieve a layer that corresponds to selected attribute value (e.g., retrieving a purple background layer for the first layer, retrieving a layer containing a blank white body for the second layer, etc.). Upon acquiring the respective attribute layers, the token minting service 132 can flatten the attribute layers to form the image 142. Alternatively, in some implementations, the token minting service 132 can transmit the set of attribute values to a separate device and/or separate application, such as an image editing application. In such instances, the separate device and/or application can generate the image 142 based on the set of attribute values. Additionally or alternatively, in some implementations, the device generating the image 142 can generate the image 142 in parallel with the second smart contract 152(2) generating the token 144. Upon generating the image 142, the token minting service 132 can transmit the image 142 to the data store 140, where the image is publicly accessible through a specific address.

At step 1216, the physical token minter 110 provides the image 142 and token(s) 144. In various implementations, the token minting service 132 can cause the physical token minter 110, the client device 106, and/or one or more other devices to display the image 142 and/or information included in the generated tokens 144. For example, in some implementations, the token minting service 132 can cause the display device 324 connected to the physical token minter 110 to display a screen 1110 that includes the image 142. Additionally or alternatively, in some implementations, the token minting service 132 can transmit a message to the wallet application 108 included in the client device 106 to update to a screen 1150 that displays the image 142. In some implementations, the display device 324 and/or the client device 106 can display information associated with the token 144, such as a token identifier and/or a notification that the token has been recorded to the distributed ledger.

Figure 13:
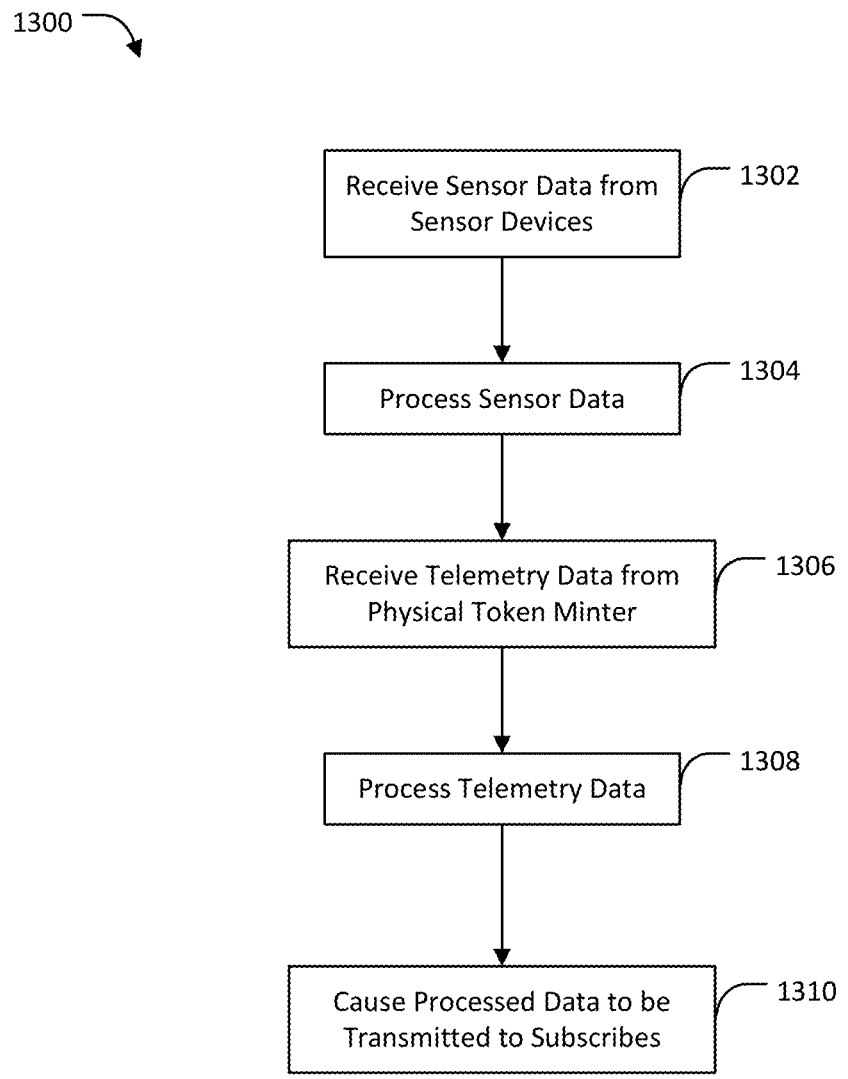
FIG. 13 sets forth a flow diagram of method steps for publishing acquired sensor data and telemetry data acquired in the token minting environment of FIG. 1, in accordance with example implementations.

FIG. 13 sets forth a flow diagram of method steps for publishing acquired sensor data and telemetry data acquired in the token minting environment 100 of FIG. 1, in accordance with example implementations. Although the method steps are described in conjunction with FIGS. 1-11, persons of ordinary skill in the art will understand that any system configured to perform this method and/or other methods described herein, in any order, and in any combination not logically contradicted, is within the scope of the present invention.

The example process 1300 can be implemented, for example, by a computing device that comprises a processor and a non-transitory computer-readable medium. The non-transitory computer readable medium can be storing instructions that, when executed by the processor, can cause the processor to perform the operations of the illustrated process 1300. Alternatively or additionally, the process 1300 can be implemented using a non-transitory computer-readable medium storing instructions that, when executed by one or more processors, case the one or more processors to perform the operations of the process 1300 of FIG. 13.

As shown, the method 1300 begins at step 1302, where the remote server 130 receives sensor data from one or more sensor devices 120. In various implementations, the one or more sensor devices 120 included in the token minting environment 100 can acquire sensor data from a physical environment and transmit one or more messages 504 that include the sensor data. Alternatively, in some implementations, the one or more sensor devices 120 can transmit the sensor data to the physical token minter 110. In such instances, the physical token minter 110 can transmit the messages 504 containing the sensor data to the remote server 130.

At step 1304, the remote server 130 processes the sensor data. In various implementations, the sensor backend service 134 included in the remote server 130 can process the sensor data in real time. In such instances, the sensor backend service 134 can generate processed sensor data. Upon generating the processed sensor data, the sensor backend service 134 can forward the processed sensor data in a message 528 to the data intake and query system 102 for storage.

At step 1306, the remote server 130 receives telemetry data from the physical token minter 110. In various implementations, the physical token minter 110 can acquire various telemetry data associated with the minting of various NFTs. For example, the data analytics application 114 operating on the physical token minter 110 can aggregate telemetry data associated with the physical user interactions performed, the times that the physical interactions were performed, and the location of the physical token minter 110. In some implementations, the physical token minter 110 and/or the data analytics application 114 can generate telemetry data associated with the tokens 144 generated by the second smart contract 152(2). For example, the minting interface 112 can aggregate data associated with the attribute values associated with each set of metadata included in the tokens 144. Upon acquiring the telemetry data, the physical token minter 110 can transmit a message 524 to the remote server 130 that includes the acquired telemetry data.

At step 1308, the remote server 130 processes the received telemetry data. In various implementations, upon receiving the telemetry data, the data analysis service 136 operating on the remote server 130 can process the telemetry data in real time. In such instances, the data analysis service 136 can generate a set of processed telemetry data. In some implementations, the processed telemetry data can include generated values, such as an indicator of the rarest NFT based on the set of attribute values aggregated from the previously-generated tokens 144. Upon generating the processed sensor data, the data analysis service 136 can forward the processed telemetry data in a message 528 to the data intake and query system 102 for storage.

At step 1310, the remote server 130 causes the processed data to be transmitted to subscribers. In various implementations, one or more subscribers, such as the client device 106 and/or the physical token minter 110 can request one or more datasets, such as a sensor dataset or a telemetry data. In some implementations, the data analysis service 136 can receive the requests and query the data intake and query system 102 to retrieve the requested datasets. In some implementations, the data analysis service 136 can periodically publish datasets; in such instances, the subscribers can receive the published datasets without sending queries to retrieve the datasets. In some implementations, the data intake and query system 102 can transmit one or more messages that include information associated with the requested datasets. For example, the data intake and query system 102 can include one or more dashboards linked to the sensor dataset and/or the telemetry dataset.

In various implementations, the subscriber can update a dashboard with the received sensor dataset and/or telemetry dataset. In some implementations, the physical token minter 110 can send subsequent requests to the data intake and query system 102 in order to receive a sensor dataset that includes field values for the dashboard. In such instances, the data intake and query system 102 may respond by transmitting a data response that includes the new data values that are applicable to the subsequent requests. Upon receiving the new additional data values, the physical token minter 110 can update the dashboard.

In sum, a token minting environment includes a physical token minter that is accessible to a group of users. A given user included in the group can initiate a session with the physical token minter to mint a non-fungible token associated with an image that the physical token minter generates. When the user establishes a session with the physical token minter, the physical token minter connects with a digital wallet associated with the user. The physical token minter then identifies a physical interaction provided by the user, such as the user pulling a lever or pressing an input button that is proximate to the physical token minter. Upon identifying the user interaction, the physical token minter responds by triggering the creation of an image and the minting of a non-fungible token that links the image to the wallet of the user. The physical token minter then provides a digital representation of the image and an indication that a token for the image has been added to the digital wallet.

In various implementations, upon detecting the user interaction, a token minter application in the physical token minter can initiate the minting of the non-fungible token by checking the digital wallet to determine whether the digital wallet contains sufficient funds to complete the minting process. The funds can be specific (e.g., a specific type of digital currency). The token minter application exhausts the digital wallet of the requisite funds and transmits a message to a first smart contract published on a distributed ledger. The message triggers the first smart contract by acquiring a randomly-generated artifact (L, an identifier number) and associating the artifact with the digital wallet. The token minter application generates a set of metadata based on the generated artifact. For example, the token minter application can use the artifact to determine a set of attribute values (e.g., background color, accessories, foreground colors, etc.) that are to be included in the image. The token minter application transmits the set of metadata to a second smart contract published on the distributed ledger, where the second smart contract mints a non-fungible token. The token minter application causes an image based on the attribute values to be produced and published. The non-fungible token lists the attributes included in the image and identifies the address of the published image.

In various implementations, the physical token minter also includes a data analytics application that acquires telemetry data and receives sensor data. The data analytics application acquires telemetry data that is associated with the physical token minter managing the generation of the non-fungible tokens via the user interactions. The data analytics receives sensor data that is acquired by a group of one or more sensor devices that are located within the token minter environment. The data analytics application transmits the telemetry data and the sensor data to a set of remote servers. The set of remote servers includes a data analysis server that processes and stores the telemetry data. The set of remote servers also includes a sensor backend service that aggregates and stores the sensor data. One or more data analytics applications operating on other devices in the token minting environment can acquire the telemetry data and the sensor data via a data intake and query system and display the acquired datasets in one or more dashboards.

At least one technological advantage of the disclosed techniques relative to prior techniques is that the physical token minter that is accessible to a group of users can respond in real time to a physical user interaction by causing the generation of an image and minting of a token linking the image to the user. Such techniques enable users to acquire non-fungible tokens that are added to a collection of tokens on-demand, reducing the processing and storage space needed to initially generate a collection. Further, by linking the minting of a non-fungible token to a physical interaction proximate to the physical token minter, the physical token minter can generate non-fungible tokens that are linked to specific locations and actions associated with the physical user interaction, thereby providing unique tokens that signify the actions of the user that initiated the minting of the non-fungible token.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 14:
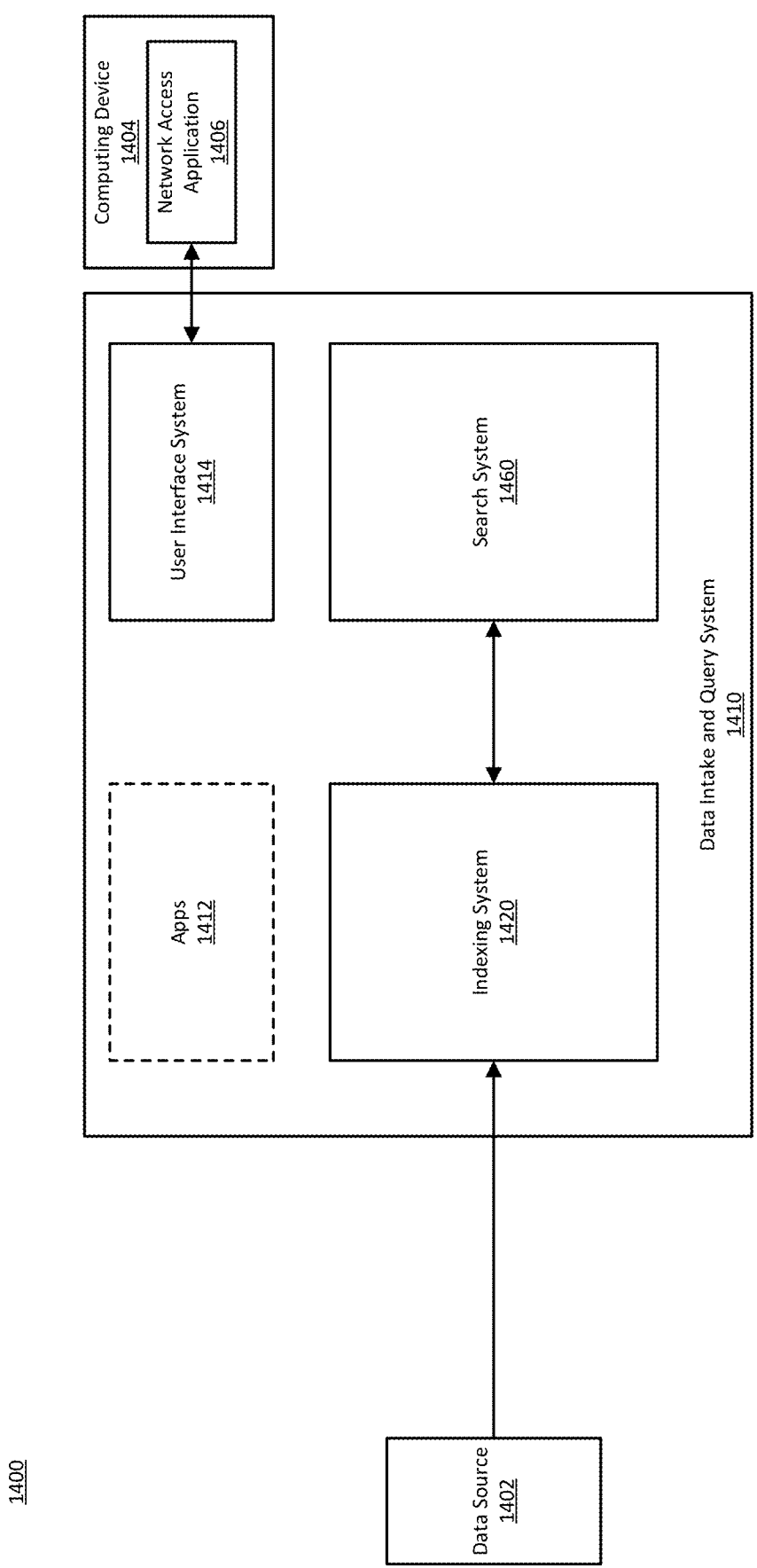
FIG. 14 is a block diagram illustrating an example computing environment that includes a data intake and query system, in accordance with example implementations.

FIG. 14 is a block diagram illustrating an example computing environment 1400 that includes a data intake and query system 1410. The data intake and query system 1410 obtains data from a data source 1402 in the computing environment 1400, and ingests the data using an indexing system 1420. A search system 1460 of the data intake and query system 1410 enables users to navigate the indexed data. Though drawn with separate boxes in FIG. 14, in some implementations the indexing system 1420 and the search system 1460 can have overlapping components. A computing device 1404, running a network access application 1406, can communicate with the data intake and query system 1410 through a user interface system 1414 of the data intake and query system 1410. Using the computing device 1404, a user can perform various operations with respect to the data intake and query system 1410, such as administration of the data intake and query system 1410, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1410 can further optionally include apps 1412 that extend the search, analytics, and/or visualization capabilities of the data intake and query system 1410.

The data intake and query system 1410 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1410 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1410 can be executed on a single computing device, or execution of the program code can be distributed over multiple computing devices. For example, the program code can include instructions for both indexing and search components (which may be part of the indexing system 1420 and/or the search system 1460, respectively), which can be executed on a computing device that also provides the data source 1402. As another example, the program code can be executed on one computing device, where execution of the program code provides both indexing and search components, while another copy of the program code executes on a second computing device that provides the data source 1402. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1402 of the computing environment 1400 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1402 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1420 obtains machine date from the data source 1402 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1420 does not require prior knowledge of the structure of incoming data (e.g., the indexing system 1420 does not need to be provided with a schema describing the data). Additionally, the indexing system 1420 retains a copy of the data as it was received by the indexing system 1420 such that the original data is always available for searching (e.g., no data is discarded, though, in some examples, the indexing system 1420 can be configured to do so).

The search system 1460 searches the data stored by the indexing 1420 system. As discussed in greater detail below, the search system 1460 enables users associated with the computing environment 1400 (and possibly also other users) to navigate the data, generate reports, and visualize search results in "dashboards" output using a graphical interface. Using the facilities of the search system 1460, users can obtain insights about the data, such as retrieving events from an index, calculating metrics, searching for specific conditions within a rolling time window, identifying patterns in the data, and predicting future trends, among other examples. To achieve greater efficiency, the search system 1460 can apply map-reduce methods to parallelize searching of large volumes of data. Additionally, because the original data is available, the search system 1460 can apply a schema to the data at search time. This allows different structures to be applied to the same data, or for the structure to be modified if or when the content of the data changes. Application of a schema at search time may be referred to herein as a late-binding schema technique.

The user interface system 1414 provides mechanisms through which users associated with the computing environment 1400 (and possibly others) can interact with the data intake and query system 1410. These interactions can include configuration, administration, and management of the indexing system 1420, initiation and/or scheduling of queries that are to be processed by the search system 1460, receipt or reporting of search results, and/or visualization of search results. The user interface system 1414 can include, for example, facilities to provide a command line interface or a web-based interface.

Users can access the user interface system 1414 using a computing device 1404 that communicates with data intake and query system 1410, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1400. For example, a person can log in as a particular user and, using the user's digital information, can access the data intake and query system 1410. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1404 can provide a human-machine interface through which a person can have a digital presence in the computing environment 1400 in the form of a user. The computing device 1404 is an electronic device having one or more processors and a memory capable of storing instructions for execution by the one or more processors. The computing device 1404 can further include input/output (I/O) hardware and a network interface. Applications executed by the computing device 1404 can include a network access application 1406, such as a web browser, which can use a network interface of the client computing device 1404 to communicate, over a network, with the user interface system 1414 of the data intake and query system #A110. The user interface system 1414 can use the network access application 1406 to generate user interfaces that enable a user to interact with the data intake and query system #A110. A web browser is one example of a network access application. A shell tool can also be used as a network access application. In some examples, the data intake and query system 1410 is an application executing on the computing device 1404. In such examples, the network access application 1406 can access the user interface system 1414 without going over a network.

The data intake and query system 1410 can optionally include apps 1412. An app of the data intake and query system 1410 is a collection of configurations, knowledge objects (a user-defined entity that enriches the data in the data intake and query system 1410), views, and dashboards that may provide additional functionality, different techniques for searching the data, and/or additional insights into the data. The data intake and query system 1410 can execute multiple applications simultaneously. Example applications include an information technology service intelligence application, which can monitor and analyze the performance and behavior of the computing environment 1400, and an enterprise security application, which can include content and searches to assist security analysts in diagnosing and acting on anomalous or malicious behavior in the computing environment 1400.

Though FIG. 14 illustrates only one data source, in practical implementations, the computing environment 1400 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1400, the data intake and query system 1410 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities.

In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1400 can include on-prem and cloud-based computing resources, or only cloud-based resources. For example, an entity may have on-prem computing devices and a private cloud. In this example, the entity operates the data intake and query system 1410 and can choose to execute the data intake and query system 1410 on an on-prem computing device or in the cloud. In another example, a provider entity operates the data intake and query system 1410 in a public cloud and provides the functionality of the data intake and query system 1410 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1410. In some implementations, the entity providing the data intake and query system 1410 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1410, and a third entity can subscribe to the services of the second provider entity in order to use the functionality of the data intake and query system 1410. In this example, the data sources are associated with the third entity, users accessing the data intake and query system 1410 are associated with the third entity, and the analytics and insights provided by the data intake and query system 1410 are for purposes of the third entity's operations.

Figure 15:
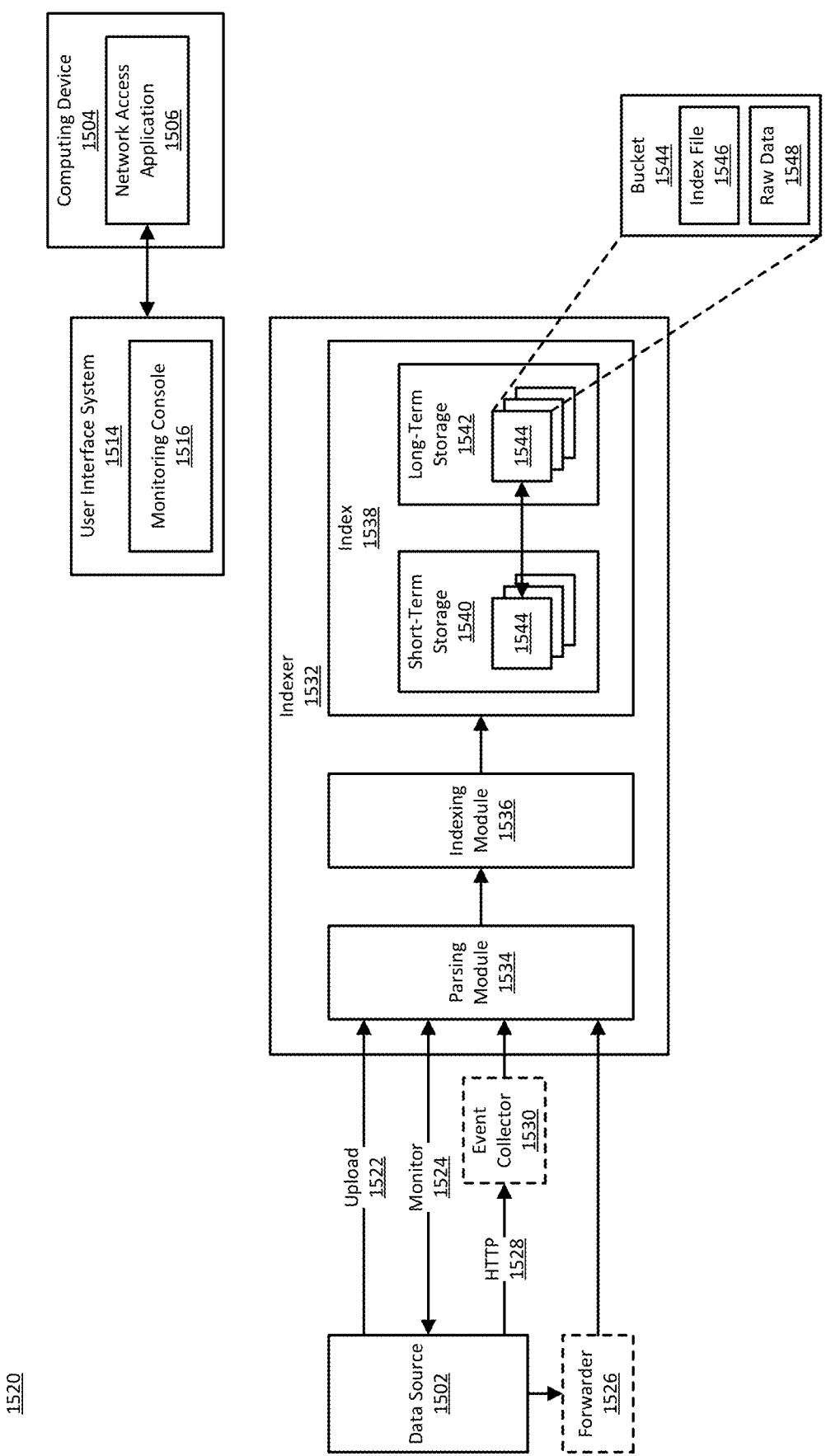
FIG. 15 is a block diagram illustrating in greater detail an example of an indexing system of a data intake and query system, such as the data intake and query system of FIG. 14, in accordance with example implementations.

FIG. 15 is a block diagram illustrating in greater detail an example of an indexing system 1520 of a data intake and query system, such as the data intake and query system 1410 of FIG. 14. The indexing system 1520 of FIG. 15 uses various methods to obtain machine data from a data source 1502 and stores the data in an index 1538 of an indexer 1532. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1520 enables the data intake and query system to obtain the machine data produced by the data source 1502 and to store the data for searching and retrieval.

Users can administer the operations of the indexing system 1520 using a computing device 1504 that can access the indexing system 1520 through a user interface system 1514 of the data intake and query system. For example, the computing device 1504 can be executing a network access application 1506, such as a web browser or a terminal, through which a user can access a monitoring console 1516 provided by the user interface system 1514. The monitoring console 1516 can enable operations such as: identifying the data source 1502 for data ingestion; configuring the indexer 1532 to index the data from the data source 1532; configuring a data ingestion method; configuring, deploying, and managing clusters of indexers; and viewing the topology and performance of a deployment of the data intake and query system, among other operations. The operations performed by the indexing system 1520 may be referred to as "index time" operations, which are distinct from "search time" operations that are discussed further below.

The indexer 1532, which may be referred to herein as a data indexing component, coordinates and performs most of the index time operations. The indexer 1532 can be implemented using program code that can be executed on a computing device. The program code for the indexer 1532 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1532. In some implementations, the indexer 1532 executes on the computing device 1504 through which a user can access the indexing system 1520. In some implementations, the indexer 1532 executes on a different computing device than the illustrated computing device 1504.

The indexer 1532 may be executing on the computing device that also provides the data source 1502 or may be executing on a different computing device. In implementations wherein the indexer 1532 is on the same computing device as the data source 1502, the data produced by the data source 1502 may be referred to as "local data." In other implementations the data source 1502 is a component of a first computing device and the indexer 1532 executes on a second computing device that is different from the first computing device. In these implementations, the data produced by the data source 1502 may be referred to as "remote data." In some implementations, the first computing device is "on-prem" and in some implementations the first computing device is "in the cloud." In some implementations, the indexer 1532 executes on a computing device in the cloud and the operations of the indexer 1532 are provided as a service to entities that subscribe to the services provided by the data intake and query system.

For a given data produced by the data source 1502, the indexing system 1520 can be configured to use one of several methods to ingest the data into the indexer 1532. These methods include upload 1522, monitor 1524, using a forwarder 1526, or using HyperText Transfer Protocol (HTTP 1528) and an event collector 1530. These and other methods for data ingestion may be referred to as "getting data in" (GDI) methods.

Using the upload 1522 method, a user can specify a file for uploading into the indexer 1532. For example, the monitoring console 1516 can include commands or an interface through which the user can specify where the file is located (e.g., on which computing device and/or in which directory of a file system) and the name of the file. The file may be located at the data source 1502 or maybe on the computing device where the indexer 1532 is executing. Once uploading is initiated, the indexer 1532 processes the file, as discussed further below. Uploading is a manual process and occurs when instigated by a user. For automated data ingestion, the other ingestion methods are used.

The monitor 1524 method enables the indexing system 1502 to monitor the data source 1502 and continuously or periodically obtain data produced by the data source 1502 for ingestion by the indexer 1532. For example, using the monitoring console 1516, a user can specify a file or directory for monitoring. In this example, the indexing system 1502 can execute a monitoring process that detects whenever the file or directory is modified and causes the file or directory contents to be sent to the indexer 1532. As another example, a user can specify a network port for monitoring. In this example, a monitoring process can capture data received at or transmitting from the network port and cause the data to be sent to the indexer 1532. In various examples, monitoring can also be configured for data sources such as operating system event logs, performance data generated by an operating system, operating system registries, operating system directory services, and other data sources.

Monitoring is available when the data source 1502 is local to the indexer 1532 (e.g., the data source 1502 is on the computing device where the indexer 1532 is executing). Other data ingestion methods, including forwarding and the event collector 1530, can be used for either local or remote data sources.

A forwarder 1526, which may be referred to herein as a data forwarding component, is a software process that sends data from the data source 1502 to the indexer 1532. The forwarder 1526 can be implemented using program code that can be executed on the computer device that provides the data source 1502. A user launches the program code for the forwarder 1526 on the computing device that provides the data source 1502. The user can further configure the forwarder 1526, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1526 can provide various capabilities. For example, the forwarder 1526 can send the data unprocessed or can perform minimal processing on the data before sending the data to the indexer 1532. Minimal processing can include, for example, adding metadata tags to the data to identify a source, source type, and/or host, among other information, dividing the data into blocks, and/or applying a timestamp to the data. In some implementations, the forwarder 1526 can break the data into individual events (event generation is discussed further below) and send the events to a receiver. Other operations that the forwarder 1526 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1530 provides an alternate method for obtaining data from the data source 1502. The event collector 1530 enables data and application events to be sent to the indexer 1532 using HTTP 1528. The event collector 1530 can be implemented using program code that can be executing on a computing device. The program code may be a component of the data intake and query system or can be a standalone component that can be executed independently of the data intake and query system and operates in cooperation with the data intake and query system.

To use the event collector 1530, a user can, for example using the monitoring console 1516 or a similar interface provided by the user interface system 1514, enable the event collector 1530 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1502 as an alternative method to using a username and password for authentication.

To send data to the event collector 1530, the data source 1502 is supplied with a token and can then send HTTP 1528 requests to the event collector 1530. To send HTTP 1528 requests, the data source 1502 can be configured to use an HTTP client and/or to use logging libraries such as those supplied by Java, JavaScript, and NET libraries. An HTTP client enables the data source 1502 to send data to the event collector 1530 by supplying the data, and a Uniform Resource Identifier (URI) for the event collector 1530 to the HTTP client. The HTTP client then handles establishing a connection with the event collector 1530, transmitting a request containing the data, closing the connection, and receiving an acknowledgment if the event collector 1530 sends one. Logging libraries enable HTTP 1528 requests to the event collector 1530 to be generated directly by the data source. For example, an application can include or link a logging library, and through functionality provided by the logging library manage establishing a connection with the event collector 1530, transmitting a request, and receiving an acknowledgement.

An HTTP 1528 request to the event collector 1530 can contain a token, a channel identifier, event metadata, and/or event data. The token authenticates the request with the event collector 1530. The channel identifier, if available in the indexing system 1520, enables the event collector 1530 to segregate and keep separate data from different data sources. The event metadata can include one or more key-value pairs that describe the data source 1502 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1530 extracts events from HTTP 1528 requests and sends the events to the indexer 1532. The event collector 1530 can further be configured to send events to one or more indexers. Extracting the events can include associating any metadata in a request with the event or events included in the request. In these implementations, event generation by the indexer 1532 (discussed further below) is bypassed, and the indexer 1532 moves the events directly to indexing. In some implementations, the event collector 1530 extracts event data from a request and outputs the event data to the indexer 1532, and the indexer generates events from the event data. In some implementations, the event collector 1530 sends an acknowledgement message to the data source 1502 to indicate that the event collector 1530 has received a particular request form the data source 1502, and/or to indicate to the data source 1502 that events in the request have been added to an index.

The indexer 1532 ingests incoming data and transforms the data into searchable knowledge in the form of events. In the data intake and query system, an event is a single piece of data that represents activity of the component represented in FIG. 15 by the data source 1502. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1532 can include a parsing module 1534 and an indexing module 1536 for generating and storing the events. The parsing module 1534 and indexing module 1536 can be modular and pipelined, such that one component can be operating on a first set of data while the second component is simultaneously operating on a second sent of data. Additionally, the indexer 1532 may at any time have multiple instances of the parsing module 1534 and indexing module 1536, with each set of instances configured to simultaneously operate on data from the same data source or from different data sources. The parsing module 1534 and indexing module 1536 are illustrated in FIG. 15 to facilitate discussion, with the understanding that implementations with other components are possible to achieve the same functionality.

The parsing module 1534 determines information about incoming event data, where the information can be used to identify events within the event data. For example, the parsing module 1534 can associate a source type with the event data. A source type identifies the data source 1502 and describes a possible data structure of event data produced by the data source 1502. For example, the source type can indicate which fields to expect in events generated at the data source 1502 and the keys for the values in the fields, and possibly other information such as sizes of fields, an order of the fields, a field separator, and so on. The source type of the data source 1502 can be specified when the data source 1502 is configured as a source of event data. Alternatively, the parsing module 1534 can determine the source type from the event data, for example from an event field in the event data or using machine learning techniques applied to the event data.

Other information that the parsing module 1534 can determine includes timestamps. In some cases, an event includes a timestamp as a field, and the timestamp indicates a point in time when the action represented by the event occurred or was recorded by the data source 1502 as event data. In these cases, the parsing module 1534 may be able to determine from the source type associated with the event data that the timestamps can be extracted from the events themselves. In some cases, an event does not include a timestamp and the parsing module 1534 determines a timestamp for the event, for example from a name associated with the event data from the data source 1502 (e.g., a file name when the event data is in the form of a file) or a time associated with the event data (e.g., a file modification time). As another example, when the parsing module 1534 is not able to determine a timestamp from the event data, the parsing module 1534 may use the time at which it is indexing the event data. As another example, the parsing module 1534 can use a user-configured rule to determine the timestamps to associate with events.

The parsing module 1534 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1534 may be able to determine event boundaries from the source type associated with the event data, for example from a data structure indicated by the source type. In some implementations, a user can configure rules the parsing module 1534 can use to identify event boundaries.

The parsing module 1534 can further extract data from events and possibly also perform transformations on the events. For example, the parsing module 1534 can exteract a set of fields (key-value pairs) for each event, such as a host or hostname, source or source name, and/or source type. The parsing module 1534 may extract certain fields by default or based on a user configuration. Alternatively or additionally, the parsing module 1534 may add fields to events, such as a source type or a user-configured field. As another example of a transformation, the parsing module 1534 can anonymize fields in events to mask sensitive information, such as social security numbers or account numbers. Anonymizing fields can include changing or replacing values of specific fields. The parsing module 1534 can further perform user-configured transformations.

The parsing module 1534 outputs the results of processing incoming event data to the indexing module 1536, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1532 can be configured to identify searchable segments that are parts of fields, searchable segments that are entire fields, or both. The parsing module 1534 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1546, to find event data that matches a search query. In some implementations, segmentation can alternatively be performed by the forwarder 1526. Segmentation can also be disabled, in which case the indexer 1532 will not build a lexicon for the event data. When segmentation is disabled, the search system searches the event data directly.

Building index data structures generates the index 1538. The index 1538 is a storage data structure on a storage device (e.g., a disk drive or other physical device for storing digital data). The storage device may be a component of the computing device on which the indexer 1532 is operating (referred to herein as local storage) or may be a component of a different computing device (referred to herein as remote storage) that the indexer 1538 has access to over a network. The indexer 1532 can manage more than one index and can manage indexes of different types. For example, the indexer 1532 can manage event indexes, which impose minimal structure on stored data and can accommodate any type of data. As another example, the indexer 1532 can manage metrics indexes, which use a highly structured format to handle the higher volume and lower latency demands associated with metrics data.

The indexing module 1536 organizes files in the index 1538 in directories referred to as buckets. The files in a bucket 1544 can include raw data files, index files, and possibly also other metadata files. As used herein, "raw data" means data as when the data was produced by the data source 1502, without alteration to the format or content. As noted previously, the parsing module 1534 may add fields to event data and/or perform transformations on fields in the event data. Event data that has been altered in this way is referred to herein as enriched data. A raw data file 1548 can include enriched data, in addition to or instead of raw data. The raw data file 1548 may be compressed to reduce disk usage. An index file 1546, which may also be referred to herein as a "time-series index" or tsidx file, contains metadata that the indexer 1532 can use to search a corresponding raw data file 1548. As noted above, the metadata in the index file 1546 includes a lexicon of the event data, which associates each unique keyword in the event data with a reference to the location of event data within the raw data file 1548. The keyword data in the index file 1546 may also be referred to as an inverted index. In various implementations, the data intake and query system can use index files for other purposes, such as to store data summarizations that can be used to accelerate searches.

A bucket 1544 includes event data for a particular range of time. The indexing module 1536 arranges buckets in the index 1538 according to the age of the buckets, such that buckets for more recent ranges of time are stored in short-term storage 1540 and buckets for less recent ranges of time are stored in long-term storage 1542. Short-term storage 1540 may be faster to access while long-term storage 1542 may be slower to access. Buckets may be moves from short-term storage 1540 to long-term storage 1542 according to a configurable data retention policy, which can indicate at what point in time a bucket is old enough to be moved.

A bucket's location in short-term storage 1540 or long-term storage 1542 can also be indicated by the bucket's status. As an example, a bucket's status can be "hot," "warm," "cold," "frozen," or "thawed." In this example, hot bucket is one to which the indexer 1532 is writing data and the bucket becomes a warm bucket when the index 1532 stops writing data to it. In this example, both hot and warm buckets reside in short-term storage 1540. Continuing this example, when a warm bucket is moved to long-term storage 1542, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1520 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1520 through the monitoring console 1516 provided by the user interface system 1514. Using the monitoring console 1516, the user can configure and monitor an index cluster, and see information such as disk usage by an index, volume usage by an indexer, index and volume size over time, data age, statistics for bucket types, and bucket settings, among other information.

Figure 16:
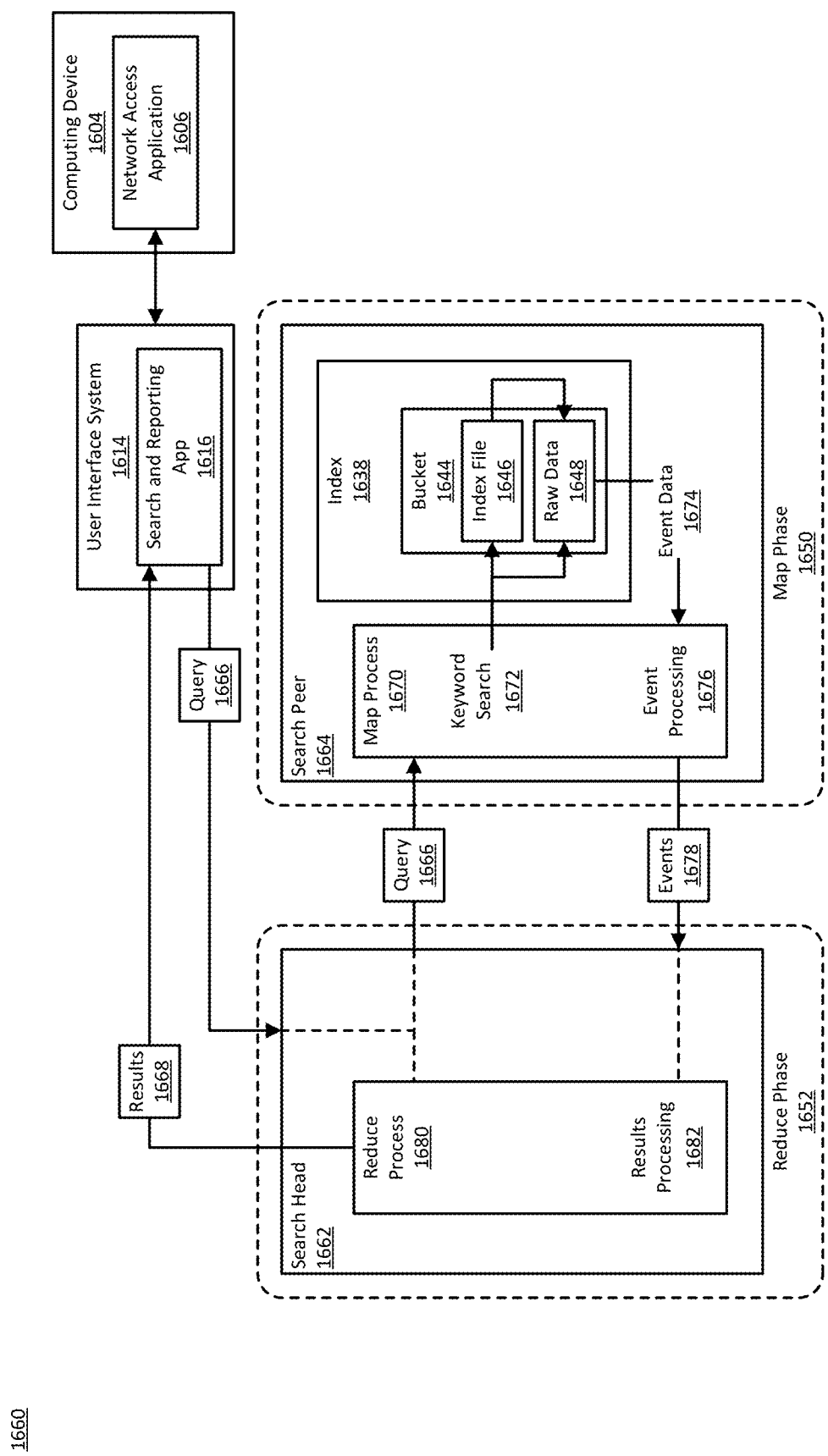
FIG. 16 is a block diagram illustrating in greater detail an example of the search system 1660 of a data intake and query system, such as the data intake and query system of FIG. 14, in accordance with example implementations.

FIG. 16 is a block diagram illustrating in greater detail an example of the search system 1660 of a data intake and query system, such as the data intake and query system 1410 of FIG. 14. The search system 1660 of FIG. 16 issues a query 1666 to a search head 1662, which sends the query 1666 to a search peer 1664. Using a map process 1630, the search peer 1664 searches the appropriate index 1638 for events identified by the query 1666 and sends events 1678 so identified back to the search head 1662. Using a reduce process 1642, the search head 1662 processes the events 1678 and produces results 1668 to respond to the query 1666. The results 1668 can provide useful insights about the data stored in the index 1638. These insights can aid in the administration of information technology systems, in security analysis of information technology systems, and/or in analysis of the development environment provided by information technology systems.

The query 1666 that initiates a search is produced by a search and reporting app 1616 that is available through the user interface system 1614 of the data intake and query system. Using a network access application 1606 executing on a computing device 1604, a user can input the query 1666 into a search field provided by the search and reporting app 1616. Alternatively or additionally, the search and reporting app 1616 can include pre-configured queries or stored queries that can be activated by the user. In some cases, the search and reporting app 1616 initiates the query 1666 when the user enters the query 1666. In these cases, the query 1666 maybe referred to as an "ad-hoc" query. In some cases, the search and reporting app 1616 initiates the query 1666 based on a schedule. For example, the search and reporting app 1616 can be configured to execute the query 1666 once per hour, once per day, at a specific time, on a specific date, or at some other time that can be specified by a date, time, and/or frequency. These types of queries maybe referred to as scheduled queries.

The query 1666 is specified using a search processing language. The search processing language includes commands or search terms that the search peer 1664 will use to identify events to return in the search results 1668. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1666 to include sequential commands, where a subsequent command may operate on the results of a prior command. As an example, sequential commands may be separated in the query 1666 by a vertical line ("|" or "pipe") symbol.

In addition to one or more search commands, the query 1666 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1666 occurs in two broad phases: a map phase 1650 and a reduce phase 1652. The map phase 1650 takes place across one or more search peers. In the map phase 1650, the search peers locate event data that matches the search terms in the search query 1666 and sorts the event data into field-value pairs. When the map phase 1650 is complete, the search peers send events that they have found to one or more search heads for the reduce phase 1652. During the reduce phase 1652, the search heads process the events through commands in the search query 1666 and aggregate the events to produce the final search results 1668.

A search head, such as the search head 1662 illustrated in FIG. 16, is a component of the search system 1660 that manages searches. The search head 1662, which may also be referred to herein as a search management component, can be implemented using program code that can be executed on a computing device. The program code for the search head 1662 can be stored on a non-transitory computer-readable medium and from this medium can be loaded or copied to the memory of a computing device. One or more hardware processors of the computing device can read the program code from the memory and execute the program code in order to implement the operations of the search head 1662.

Upon receiving the search query 1666, the search head 1662 directs the query 1666 to one or more search peers, such as the search peer 1664 illustrated in FIG. 16. "Search peer" is an alternate name for "indexer" and a search peer may be largely similar to the indexer described previously. The search peer 1664 may be referred to as a "peer node" when the search peer 1664 is part of an indexer cluster. The search peer 1664, which may also be referred to as a search execution component, can be implemented using program code that can be executed on a computing device. In some implementations, one set of program code implements both the search head 1662 and the search peer 1664 such that the search head 1662 and the search peer 1664 form one component. In some implementations, the search head 1662 is an independent piece of code that performs searching and no indexing functionality. In these implementations, the search head 1662 may be referred to as a dedicated search head.

The search head 1662 may consider multiple criteria when determining whether to send the query 1666 to the particular search peer 1664. For example, the search system 1660 may be configured to include multiple search peers that each have duplicative copies of at least some of the event data and are implanted using different hardware resources q. In this example, the sending the search query 1666 to more than one search peer allows the search system 1660 to distribute the search workload across different hardware resources. As another example, search system 1660 may include different search peers for different purposes (e.g., one has an index storing a first type of data or from a first data source while a second has an index storing a second type of data or from a second data source). In this example, the search query 1666 may specify which indexes to search, and the search head 1662 will send the query 1666 to the search peers that have those indexes.

To identify events 1678 to send back to the search head 1662, the search peer 1664 performs a map process 1630 to obtain event data 1674 from the index 1638 that is maintained by the search peer 1664. During a first phase of the map process 1630, the search peer 1664 identifies buckets that have events that are described by the time indicator in the search query 1666. As noted above, a bucket contains events whose timestamps fall within a particular range of time. For each bucket 1644 whose events can be described by the time indicator, during a second phase of the map process 1630, the search peer 1664 performs a keyword search 1672 using search terms specified in the search query #A66. The search terms can be one or more of keywords, phrases, fields, Boolean expressions, and/or comparison expressions that in combination describe events being searched for. When segmentation is enabled at index time, the search peer 1664 performs the keyword search 1632 on the bucket's index file 1646. As noted previously, the index file 1646 includes a lexicon of the searchable terms in the events stored in the bucket's raw data 1648 file. The keyword search 1632 searches the lexicon for searchable terms that correspond to one or more of the search terms in the query 1666. As also noted above, the lexicon incudes, for each searchable term, a reference to each location in the raw data 1648 file where the searchable term can be found. Thus, when the keyword search identifies a searchable term in the index file 1646 that matches a search term in the query 1666, the search peer 1664 can use the location references to extract from the raw data 1648 file the event data 1674 for each event that include the searchable term.

In cases where segmentation was disabled at index time, the search peer 1664 performs the keyword search 1632 directly on the raw data 1648 file. To search the raw data 1648, the search peer 1664 may identify searchable segments in events in a similar manner as when the data was indexed. Thus, depending on how the search peer 1664 is configured, the search peer 1664 may look at event fields and/or parts of event fields to determine whether an event matches the query 1666. Any matching events can be added to the event data #A74 read from the raw data 1648 file. The search peer 1664 can further be configured to enable segmentation at search time, so that searching of the index 1638 causes the search peer 1664 to build a lexicon in the index file 1646.

The event data 1674 obtained from the raw data 1648 file includes the full text of each event found by the keyword search 1632. During a third phase of the map process 1630, the search peer 1664 performs event processing 1676 on the event data 1674, with the steps performed being determined by the configuration of the search peer 1664 and/or commands in the search query 1666. For example, the search peer 1664 can be configured to perform field discovery and field extraction. Field discovery is a process by which the search peer 1664 identifies and extracts key-value pairs from the events in the event data 1674. The search peer 1664 can, for example, be configured to automatically extract the first 100 fields (or another number of fields) in the event data 1674 that can be identified as key-value pairs. As another example, the search peer 1664 can extract any fields explicitly mentioned in the search query 1666. The search peer 1664 can, alternatively or additionally, be configured with particular field extractions to perform.

Other examples of steps that can be performed during event processing 1676 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1664 sends processed events 1678 to the search head 1662, which performs a reduce process 1640. The reduce process 1640 potentially receives events from multiple search peers and performs various results processing 1642 steps on the received events. The results processing 1642 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1642 can further include applying commands from the search query 1666 to the events. The query 1666 can include, for example, commands for evaluating and/or manipulating fields (e.g., to generate new fields from existing fields or parse fields that have more than one value). As another example, the query 1666 can include commands for calculating statistics over the events, such as counts of the occurrences of fields, or sums, averages, ranges, and so on, of field values. As another example, the query 1666 can include commands for generating statistical values for purposes of generating charts of graphs of the events.

The reduce process 1640 outputs the events found by the search query 1666, as well as information about the events. The search head 1662 transmits the events and the information about the events as search results 1668, which are received by the search and reporting app 1616. The search and reporting app 1616 can generate visual interfaces for viewing the search results 1668. The search and reporting app 1616 can, for example, output visual interfaces for the network access application 1606 running on a computing device 1604 to generate.

The visual interfaces can include various visualizations of the search results 1668, such as tables, line or area charts, Chloropleth maps, or single values. The search and reporting app 1616 can organize the visualizations into a dashboard, where the dashboard includes a panel for each visualization. A dashboard can thus include, for example, a panel listing the raw event data for the events in the search results 1668, a panel listing fields extracted at index time and/or found through field discovery along with statistics for those fields, and/or a timeline chart indicating how many events occurred at specific points in time (as indicated by the timestamps associated with each event). In various implementations, the search and reporting app 1616 can provide one or more default dashboards. Alternatively or additionally, the search and reporting app 1616 can include functionality that enables a user to configure custom dashboards.

The search and reporting app 1616 can also enable further investigation into the events in the search results 1668. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1666. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 17:
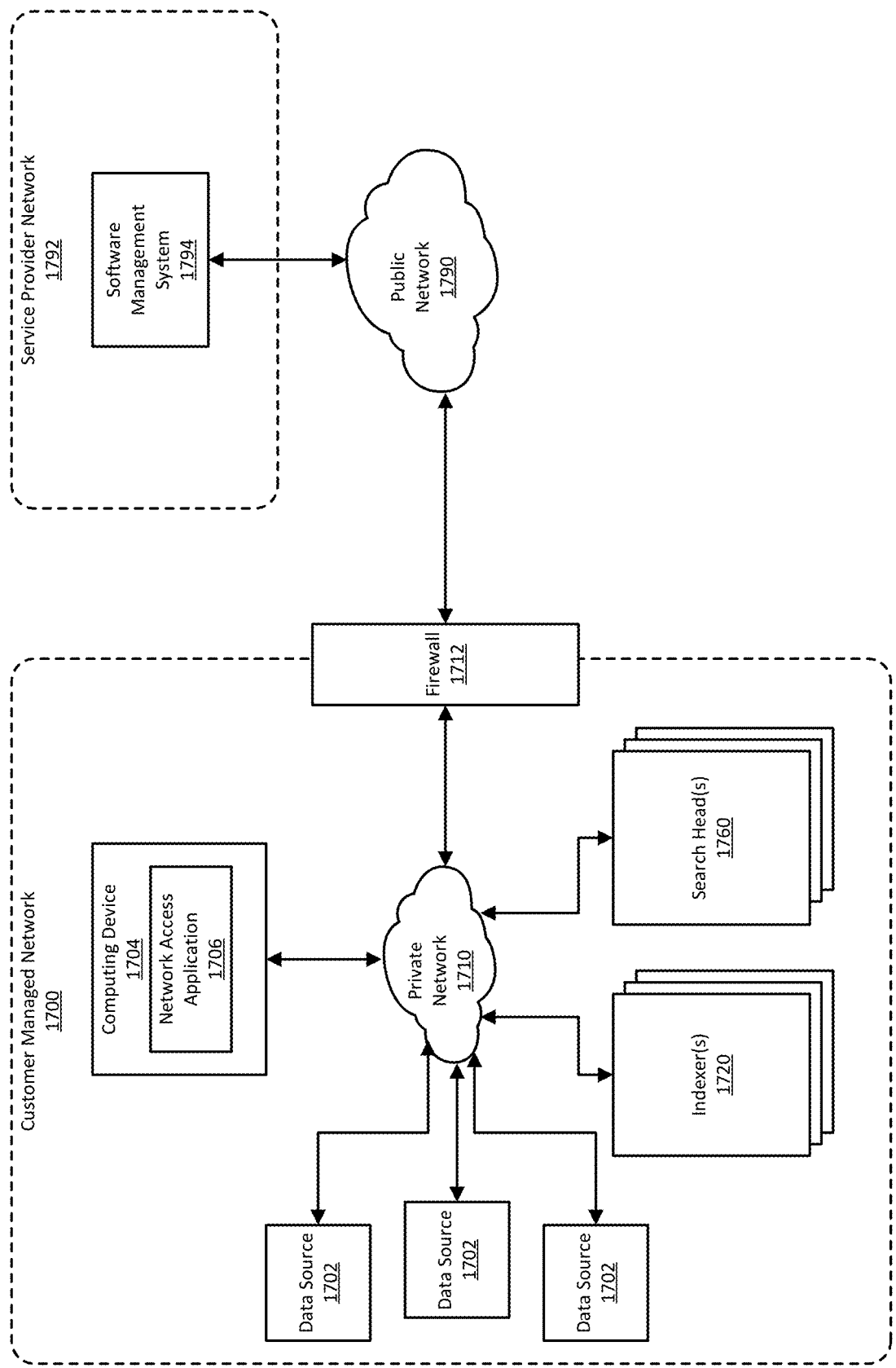
FIG. 17 illustrates an example of a self-managed network that includes a data intake and query system, in accordance with example implementations.

FIG. 17 illustrates an example of a self-managed network 1700 that includes a data intake and query system. "Self-managed" in this instance means that the entity that is operating the self-managed network 1700 configures, administers, maintains, and/or operates the data intake and query system using its own compute resources and people. Further, the self-managed network 1700 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1700 is located within the customer's on-prem environment, such as in the entity's data center, the operation and management of the self-managed network 1700, including of the resources in the self-managed network 1700, is under the control of the entity. For example, administrative personnel of the entity have complete access to and control over the configuration, management, and security of the self-managed network 1700 and its resources.

The self-managed network 1700 can execute one or more instances of the data intake and query system. An instance of the data intake and query system may be executed by one or more computing devices that are part of the self-managed network 1700. A data intake and query system instance can comprise an indexing system and a search system, where the indexing system includes one or more indexers 1720 and the search system includes one or more search heads 1760.

As depicted in FIG. 17, the self-managed network 1700 can include one or more data sources 1702. Data received from these data sources may be processed by an instance of the data intake and query system within self-managed network 1700. The data sources 1702 and the data intake and query system instance can be communicatively coupled to each other via a private network 1710.

Users associated with the entity can interact with and avail themselves of the functions performed by a data intake and query system instance using computing devices. As depicted in FIG. 17, a computing device 1704 can execute a network access application 1706 (e.g., a web browser), that can communicate with the data intake and query system instance and with data sources 1702 via the private network 1710. Using the computing device 1704, a user can perform various operations with respect to the data intake and query system, such as management and administration of the data intake and query system, generation of knowledge objects, and other functions. Results generated from processing performed by the data intake and query system instance may be communicated to the computing device 1704 and output to the user via an output system (e.g., a screen) of the computing device 1704.

The self-managed network 1700 can also be connected to other networks that are outside the entity's on-premise environment/network, such as networks outside the entity's data center. Connectivity to these other external networks is controlled and regulated through one or more layers of security provided by the self-managed network 1700. One or more of these security layers can be implemented using firewalls 1712. The firewalls 1712 form a layer of security around the self-managed network 1700 and regulate the transmission of traffic from the self-managed network 1700 to the other networks and from these other networks to the self-managed network 1700.

Networks external to the self-managed network can include various types of networks including public networks 1750, other private networks, and/or cloud networks provided by one or more cloud service providers. An example of a public network 1750 is the Internet. In the example depicted in FIG. 17, the self-managed network 1700 is connected to a service provider network 1752 provided by a cloud service provider via the public network 1750.

In some implementations, resources provided by a cloud service provider may be used to facilitate the configuration and management of resources within the self-managed network 1700. For example, configuration and management of a data intake and query system instance in the self-managed network 1700 may be facilitated by a software management system 1794 operating in the service provider network 1752. There are various ways in which the software management system 1794 can facilitate the configuration and management of a data intake and query system instance within the self-managed network 1700. As one example, the software management system 1794 may facilitate the download of software including software updates for the data intake and query system. In this example, the software management system 1794 may store information indicative of the versions of the various data intake and query system instances present in the self-managed network 1700. When a software patch or upgrade is available for an instance, the software management system 1794 may inform the self-managed network 1700 of the patch or upgrade. This can be done via messages communicated from the software management system 1794 to the self-managed network 1700.

The software management system 1794 may also provide simplified ways for the patches and/or upgrades to be downloaded and applied to the self-managed network 1700. For example, a message communicated from the software management system 1794 to the self-managed network 1700 regarding a software upgrade may include a Uniform Resource Identifier (URI) that can be used by a system administrator of the self-managed network 1700 to download the upgrade to the self-managed network 1700. In this manner, management resources provided by a cloud service provider using the service provider network 1752 and which are located outside the self-managed network 1700 can be used to facilitate the configuration and management of one or more resources within the entity's on-prem environment. In some implementations, the download of the upgrades and patches may be automated, whereby the software management system 1794 is authorized to, upon determining that a patch is applicable to a data intake and query system instance inside the self-managed network 1700, automatically communicate the upgrade or patch to self-managed network 1700 and cause it to be installed within self-managed network 1700.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

1. In various implementations, a computer-implemented method comprises receiving, based on a user interaction with a machine that is physically accessible by a plurality of users, a request to generate a non-fungible token, where the request includes an identifier associated with a digital wallet, in response to the request, exhausting an amount of a given digital currency from the digital wallet, executing a first smart contract to cause an artifact to be randomly-generated, for each of a plurality of attribute types, generating a corresponding attribute value based on the artifact, generating the non-fungible token based on the attribute values corresponding to the plurality of attribute types, and providing, via the machine, a digital representation of the non-fungible token.

2. The computer-implemented method of clause 1, further comprising receiving, from a mobile device connected to the digital wallet, a communication request to establish a communication session, and in response to the communication request, establishing a link to the mobile device.

3. The computer-implemented method of clause 1 or 2, further comprising storing the non-fungible token in a distributed ledger, where the non-fungible token uniquely associates the identifier with the attribute values.

4. The computer-implemented method of any of clauses 1-3, where the non-fungible token is generated in a real-time response to receiving the request.

5. The computer-implemented method of any of clauses 1-4, where generating the attribute values based on the artifact comprises for each attribute type of the plurality of attribute types, selecting a given attribute value from a set of weighted attribute values to, and combining the set of the selected attribute values to create an attribute list.

6. The computer-implemented method of any of clauses 1-5, where the attribute list is operable by the machine or a separate device to generate an image according to the attribute list.

7. The computer-implemented method of any of clauses 1-6, where the machine includes a set of sensor components that detect one or more physical characteristics associated with a physical environment in which the machine operates.

8. The computer-implemented method of any of clauses 1-7, where generating the attribute values comprises transmitting, to a second smart contract, token metadata including the attribute values.

9. The computer-implemented method of any of clauses 1-8, where the token metadata includes at least one of (i) a user identifier, (ii) a location of the user interaction, or (iii) a time of the user interaction.

10. The computer-implemented method of any of clauses 1-9, where the non-fungible token is included in a collection of non-fungible tokens generated by the second smart contract.

11. The computer-implemented method of any of clauses 1-10, further comprising transmitting, to an application executing in a first network, a first set of telemetry data associated with the collection.

12. The computer-implemented method of any of clauses 1-11, where the application generates a first dataset based on the first set of telemetry data.

13. The computer-implemented method of any of clauses 1-12, transmitting, to the first smart contract, authentication information, where the first smart contract causes the artifact to be randomly-generated upon validating the authentication information.

14. The computer-implemented method of any of clauses 1-13, where the authentication information includes at least one of a time of the user interaction, or a location of the user interaction.

15. In various implementations, one or more non-transitory computer-readable media store instructions that, when executed by one or more processors, cause the one or more processors to perform the steps of receiving, based on a user interaction with a machine that is physically accessible by a plurality of users, a request to generate a non-fungible token, where the request includes an identifier associated with a digital wallet, in response to the request, exhausting an amount of a given digital currency from the digital wallet, executing a first smart contract to cause an artifact to be randomly-generated, for each of a plurality of attribute types, generating a corresponding attribute value based on the artifact, generating the non-fungible token based on the attribute values corresponding to the plurality of attribute types, and providing, via the machine, a digital representation of the non-fungible token.

16. The one or more non-transitory computer-readable media of clause 15, where generating the attribute values comprises transmitting, to a second smart contract, token metadata including the attribute values, and the second smart contract adds, to the token metadata, at least one of (i) a user identifier, (ii) a location of the user interaction, or (iii) a time of the user interaction.

17. In various implementations, a computing device is accessible by a plurality of users, the computing device comprising a processor, and a non-transitory computer-readable medium having stored thereon instructions for a token generation application that, when executed by the processor, the processor executes the token generation application, executing of the token generation application including receiving, based on a user interaction, a request to generate a non-fungible token, where the request includes an identifier associated with a digital wallet, in response to the request, exhausting an amount of a given digital currency from the digital wallet, executing a first smart contract to cause an artifact to be randomly-generated, for each of a plurality of attribute types, generating a corresponding attribute value based on the artifact, generating the non-fungible token based on the attribute values corresponding to the plurality of attribute types, and providing, a digital representation of the non-fungible token.

18. The computing device of clause 17, the computing device further comprising a physical lever, where pulling the lever generates the request.

19. The computing device of clause 17 or 18, the computing device further comprising a display device, where providing the digital representation of the non-fungible token comprises displaying, on the display device, an image associated with the non-fungible token.

20. The computing device of any of clauses 17-19, where providing the digital representation of the non-fungible token comprises transmitting an image associated with the non-fungible token to a mobile device associated with the digital wallet.

21. The computing device of any of clauses 1-20, where the computing device is physically configured as a slot machine. Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
    receiving, at a machine that is physically accessible to a plurality of users, a physical user interaction by a first user to generate a non-fungible token;
    transmitting, in response to the physical user interaction by the first user with the machine to a remote server, a request to generate the non-fungible token, wherein the request includes an identifier for a digital wallet managed by a wallet application executing on a user device of the first user;
    receiving, from the machine, sensor data acquired by a sensor included in the machine, the sensor data including at least the physical user interaction by the first user, wherein the sensor tracks a plurality of previous physical interactions by the plurality of users; and
    in response to the request:
        exhausting, by the remote server and based on the identifier for the digital wallet, an amount of a given digital currency from the digital wallet,
        transmitting, from the remote server to a first smart contract, authentication information including at least a location of the physical user interaction;
        validating the authentication information by executing the first smart contract;
        upon validation, randomly generating an artifact by executing the first smart contract;
        at the remote server, for each of a plurality of attribute types, generating and selecting an attribute value based on the artifact, wherein each selected attribute value is included in a plurality of attribute values;
        generating, at the remote server, a digital image based on the plurality of attribute values;
        generating, at the remote server, the non-fungible token based on the plurality of attribute values; and
        providing, via the machine, (i) a dashboard that displays the digital image corresponding to the non-fungible token, and (ii) a physical copy of the digital image.

2. The computer-implemented method of claim 1, further comprising:
    receiving, from a mobile device connected to the digital wallet, a communication request to establish a communication session; and
    in response to the communication request, establishing a link to the mobile device.

3. The computer-implemented method of claim 1, further comprising:
    storing the non-fungible token in a distributed ledger, wherein the non-fungible token uniquely associates the identifier with the plurality of attribute values.

4. The computer-implemented method of claim 1, wherein the non-fungible token is generated in a real-time response to receiving the request.

5. The computer-implemented method of claim 1, wherein selecting the attribute value based on the artifact comprises selecting the attribute value from a set of weighted attribute values, and the plurality of attribute values comprises an attribute list.

6. The computer-implemented method of claim 5, wherein the attribute list is operable by the machine or a separate device to generate the digital image according to the plurality of attribute values included in the attribute list.

7. The computer-implemented method of claim 1, wherein:
    the machine further includes a set of sensor components that detect one or more environmental characteristics associated with a physical environment in which the machine operates;
    the set of sensor components transmits, to an application executing in a first network, environmental data associated with the one or more environmental characteristics; and
    a mobile device, upon receiving the environmental data, displays the environmental data in the dashboard.

8. The computer-implemented method of claim 1, wherein generating the non-fungible token based on the plurality of attribute values comprises transmitting, to a second smart contract, token metadata including the plurality of attribute values.

9. The computer-implemented method of claim 8, wherein the token metadata includes at least one of (i) a user identifier, (ii) the location of the physical user interaction, or (iii) a time of the physical user interaction.

10. The computer-implemented method of claim 8, wherein the non-fungible token is included in a collection of non-fungible tokens generated by the second smart contract.

11. The computer-implemented method of claim 10, further comprising transmitting, to an application executing in a first network, a first set of telemetry data associated with the collection of non-fungible tokens.

12. The computer-implemented method of claim 11, wherein the application generates a first dataset based on the first set of telemetry data, and the dashboard displays the first dataset.

13. The computer-implemented method of claim 12, wherein the dashboard further displays the first dataset.

14. The computer-implemented method of claim 1, wherein the authentication information further includes at least one of a user identifier, or a time of the physical user interaction.

15. One or more non-transitory computer-readable media storing instructions that, when executed by processors, cause the processors to perform steps of:
  receiving, at a machine that is physically accessible to a plurality of users, a physical user interaction by a first user to generate a non-fungible token;
  transmitting, in response to the physical user interaction by the first user with the machine to a remote server, a request to generate the non-fungible token, wherein the request includes an identifier for a digital wallet managed by a wallet application executing on a user device of the first user;
  receiving, from the machine, sensor data acquired by a sensor included in the machine, the sensor data including at least the physical user interaction by the first, wherein the sensor tracks a plurality of previous physical interactions by the plurality of users; and
  in response to the request:
    exhausting, by the remote server and based on the identifier for the digital wallet, an amount of a given digital currency from the digital wallet,
    transmitting, from the remote server to a first smart contract, authentication information including at least a location of the physical user interaction;
    validating the authentication information by executing the first smart contract;
    upon validation, randomly generating an artifact by executing the first smart contract;
    at the remote server, for each of a plurality of attribute types, generating and selecting an attribute value based on the artifact, wherein each selected attribute value is included in a plurality of attribute values;
    generating, at the remote server, a digital image based on the plurality of attribute values;
    generating, at the remote server, the non-fungible token based on the plurality of attribute values; and
    providing, via the machine, (i) a dashboard that displays the digital image corresponding to the non-fungible token, and (ii) a physical copy of the digital.

16. The one or more non-transitory computer-readable media of claim 15, wherein:
  generating the non-fungible token based on the plurality of attribute values comprises transmitting, to a second smart contract, token metadata including the plurality of attribute values; and
  the second smart contract adds, to the token metadata, at least one of (i) a user identifier, (ii) the location of the physical user interaction, or (iii) a time of the physical user interaction.

17. A system comprising:
a computing device accessible by a plurality of users, the computing device comprising:
  a sensor;
  a first processor; and
  a non-transitory computer-readable medium having stored thereon instructions for a token generation application that, when executed by the first processor, causes the first processor to perform the operations including:
    receiving a physical user interaction by a first user;
    in response to the physical user interaction by the first user, transmitting to a remote server a request to generate a non-fungible token, wherein the request includes an identifier for a digital wallet managed by a wallet application executing on a user device of the first user;
    transmitting to the remote server sensor data acquired by the sensor, the sensor data including at least the physical user interaction by the first user, wherein the sensor tracks a plurality of previous physical interactions by the plurality of users; and
    in response to the request, providing (i) a dashboard that displays a digital image corresponding to the non-fungible token, and
(ii) a physical copy of the digital image;
the remote server:
  a second processor; and
  a non-transitory computer-readable medium having stored thereon instructions which when executed by the second processor, cause the second processor to perform operations including:
    exhausting, based on the identifier for the digital wallet, an amount of a given digital currency from the digital wallet,
    transmitting, to a first smart contract, authentication information including at least a location of the physical user interaction;
    validating the authentication information by executing the first smart contract;
    upon validation, randomly generating an artifact by executing the first smart contract;
    for each of a plurality of attribute types, generating and selecting an attribute value based on the artifact, wherein each selected attribute value is included in a plurality of attribute values;
    generating the digital image based on the plurality of attribute values;
    generating the non-fungible token based on the plurality of attribute values.

18. The system of claim 17, further comprising a physical lever, wherein the physical user interaction comprises the first user pulling the physical lever.

19. The system of claim 17, wherein the executing of the token generation application further includes providing the digital image comprises transmitting the digital image to a mobile device associated with the digital wallet.

20. The system of claim 18, wherein the computing device is physically configured as a slot machine.

\* \* \* \* \*